(12) United States Patent
Sakamoto et al.

(10) Patent No.: US 8,638,402 B2
(45) Date of Patent: Jan. 28, 2014

(54) STEREOSCOPIC DISPLAY

(71) Applicant: Sony Corporation, Tokyo (JP)

(72) Inventors: Sho Sakamoto, Tokyo (JP); Kenichi Takahashi, Kanagawa (JP); Koji Ishioka, Kanagawa (JP); Masayoshi Akita, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 13/739,424

(22) Filed: Jan. 11, 2013

(65) Prior Publication Data
US 2013/0128162 A1 May 23, 2013

Related U.S. Application Data

(63) Continuation of application No. 12/727,951, filed on Mar. 19, 2010, now Pat. No. 8,436,953.

(30) Foreign Application Priority Data

Apr. 13, 2009 (JP) ................................. 2009-097371

(51) Int. Cl.
G02F 1/1335 (2006.01)
G02F 1/1343 (2006.01)

(52) U.S. Cl.
USPC .......................................... 349/15; 349/145

(58) Field of Classification Search
USPC .................................................. 349/15, 145
See application file for complete search history.

(56) References Cited

U.S. PATENT DOCUMENTS

| 5,602,658 | A | * | 2/1997 | Ezra et al. ........................ 349/95 |
| 5,953,148 | A | * | 9/1999 | Moseley et al. ............... 359/237 |
| 6,064,424 | A | | 5/2000 | Van Blerkel et al. |
| 6,118,584 | A | * | 9/2000 | Van Berkel et al. .......... 359/463 |
| 7,800,703 | B2 | | 9/2010 | Zuidema et al. |
| 2006/0152812 | A1 | | 7/2006 | Woodgate et al. |
| 2007/0103547 | A1 | | 5/2007 | Kim et al. |

FOREIGN PATENT DOCUMENTS

| JP | 2005-309374 | 11/2005 |
| JP | 2005-316372 | 11/2005 |

* cited by examiner

Primary Examiner — Edward Glick
Assistant Examiner — Dennis Y Kim
(74) Attorney, Agent, or Firm — Robert J. Depke; The Chicago Technology Law Group, LLC

(57) ABSTRACT

A stereoscopic display includes: a display panel configured to display an image in either one of two or more arrangement states including a first arrangement state and a second arrangement state which are switchable with each other; and a lens array device arranged to face a display surface of the display panel. The lens array device produces a lens effect in a direction, the direction of effect being changed between in the first arrangement state and in the second arrangement state. The display panel includes an array of a plurality of sub-pixels, and a combination of sub-pixels used as a unit pixel is changed between in the first arrangement state and in the second arrangement state.

6 Claims, 20 Drawing Sheets

STEREOSCOPIC DISPLAY

The subject matter of application Ser. No. 12/727,951, is incorporated herein by reference. The present application is a Continuation of U.S. Ser. No. 12/727,951, filed Mar. 19, 2010, which claims priority to Japanese Patent Application No. JP 2009-097371 filed in the Japanese Patent Office on Apr. 13, 2009, the entire content of which is hereby incorporated by reference.

BACKGROUND OF THE INVENTION

1. Field of the Invention

The present invention relates to a stereoscopic display achieving stereoscopic vision by a lenticular system.

2. Description of the Related Art

In related art, one of stereoscopic display systems which are allowed to achieve stereoscopic vision with naked eyes without wearing special glasses is called a lenticular system using a lenticular lens. As illustrated in FIG. 12, the lenticular lens is a cylindrical lens array 302 in which a large number of semicolumnar lenses called cylindrical lenses 303 having refractive power only in a one-dimensional direction are arranged in a one-dimensional direction. The lenticular system has a configuration in which the cylindrical lens array 302 is arranged to face a display surface of a display panel 301 configured of a two-dimensional display. Each of the cylindrical lenses 303 arranged so as to extend in a longitudinal direction of a display surface of the display panel 301 and to have refractive power in a lateral direction. A plurality of display pixels are regularly two-dimensionally arranged on the display surface of the display panel 301. In the lenticular system, two or more pixels are arranged on a back surface of one cylindrical lens 303, and light rays from the pixels are emitted in different horizontal directions by the refractive power of the lens so as to satisfy binocular parallax, thereby stereoscopic vision is achievable. In the case where the number of pixels arranged on the back surface of the lens is 3 or more, motion parallax is obtained, and when the number of pixels is increased, light rays emitted from a real three-dimensional object are allowed to be reproduced precisely.

In an example illustrated in FIG. 12, two adjacent pixel lines 301R and 301L on the display surface of the display panel 301 are allocated to each cylindrical lens 303, and a right parallax image is displayed on one pixel line 301R, and a left parallax image is displayed on the other pixel line 301L. The displayed parallax images are distributed to right and left optical paths 402 and 403, respectively, by each cylindrical lens 303. Thereby, when a viewer 400 sees a stereoscopic display from a predetermined position in a predetermined direction, the right and left parallax images appropriately reach right and left eyes 401R and 401L of the viewer 400, respectively, thereby the viewer 400 perceives a stereoscopic image.

Likewise, in the case of a multi-view system, a plurality of parallax images taken in positions and directions corresponding to three or more viewpoints are equally divided in a lens pitch in a transverse direction of the cylindrical lens 303, and then allocated to be displayed. Thereby, three or more parallax images are emitted by the cylindrical lens array 302 in successive different angular ranges to form an image. In this case, a plurality of different parallax images are perceived by changing the position and the direction of the viewpoint of the viewer 400. The more the number of different parallax images corresponding to viewpoints is increased, the more realistic three-dimensional appearance is obtainable.

As the cylindrical lens array 302, for example, a resin-molded lens array of which the shape and the lens effect are fixed is applicable, but in this case, the lens effect is fixed, so the display is for three-dimensional display only. Moreover, as the cylindrical lens array 302, for example, a variable lens array configured of liquid crystal lenses is applicable. The variable lens array configured of liquid crystal lenses is electrically switchable between a state where the lens effect is produced and a state where the lens effect is not produced, so switching between two display modes, that is, a two-dimensional display mode and a three-dimensional display mode is allowed to be performed by a combination of the variable lens array and a two-dimensional display. More specifically, in the two-dimensional display mode, the lens array is turned into the state where the lens effect is not produced (a state where the lens array does not have refractive power), and display image light from the two-dimensional display passes through the lens array as it is. In the three-dimensional display mode, the lens array is turned into the state where the lens effect is produced, and the display image light from the two-dimensional display is deflected in a plurality of viewing angle directions so as to achieve stereoscopic vision.

FIGS. 13A, 13B, 14 and 15 illustrate an example of the variable lens array configured of liquid crystal lenses. As illustrated in FIGS. 13A and 13B, the lens array includes a first transparent substrate 101 and a second transparent substrate 102 which are made of, for example, a glass material, and a liquid crystal layer 103 sandwiched between the first substrate 101 and the second substrate 102. The first substrate 101 and the second substrate 102 are arranged to face each other with a distance d in between.

As illustrated in FIGS. 14 and 15, a first transparent electrode 111 configured of a transparent conductive film such as an ITO film is uniformly formed on substantially the whole surface on a side facing the second substrate 102 of the first substrate 101. Moreover, as illustrated in FIGS. 14 and 15, a second transparent electrode 112 configured of a transparent conductive film such as an ITO film is partially formed on a side facing the first substrate 101 of the second substrate 102. As illustrated in FIG. 15, the second transparent electrode 112 has, for example, an electrode width L, and extends in a longitudinal direction. A plurality of the second transparent electrodes 112 are arranged in parallel at intervals corresponding to a lens pitch p when a lens effect is produced. A space between two adjacent second transparent electrodes 112 is an opening with a width A. In addition, in FIG. 15, to describe the arrangement of the second electrodes 112, a state where the variable lens array is turned upside down, that is, the first substrate 101 is placed on an upper side, and the second substrate 102 is placed on a lower side is illustrated.

In addition, an alignment film (not illustrated) is formed between the first transparent electrode 111 and the liquid crystal layer 103. Moreover, an alignment film is formed between the second transparent electrodes 112 and the liquid crystal layer 103 in the same manner. In the liquid crystal layer 103, liquid crystal molecules 104 having refractive index anisotropy are uniformly distributed.

As illustrated in FIG. 13A, in the lens array, in a normal state where an applied voltage is 0 V, the liquid crystal molecules 104 are uniformly aligned in a predetermined direction determined by the alignment films. Therefore, a wavefront 201 of a transmission light ray is a plane wave, and the lens array is turned into a state with no lens effect. On the other hand, in the lens array, as illustrated in FIGS. 14 and 15, the second transparent electrodes 112 are arranged with the openings with the width A in between, so when a predetermined drive voltage is applied in a state illustrated in FIG. 14, an electric field distribution in the liquid crystal layer 103 is biased. More specifically, such an electric field that electric field strength increases according to the drive voltage in a part corresponding to a region where the second transparent electrode 112 is formed, and gradually degreases with decreasing distance to a central part of the opening with the width A is generated. Therefore, as illustrated in FIG. 13B, the alignment of the liquid crystal molecules 104 is changed depending on an electric field strength distribution. Thereby, the wavefront 202 of the transmission light ray is changed so that the lens array is turned into a state where a lens effect is produced by changing a refractive index distribution in the liquid crystal layer 103.

SUMMARY OF THE INVENTION

In a stereoscopic display using a lenticular system, a flat panel display such as a liquid crystal display is often used as a display device. In a typical flat panel display, as in the case of a display panel 301 illustrated in FIG. 16, sub-pixels 41R, 41G and 41B of colors R, G and B are arranged in vertical stripes. In other words, the sub-pixels 41R, 41G and 41B of the colors are arranged so that sub-pixels of the same color are arranged in a longitudinal direction and sub-pixels of different colors are periodically arranged in a transverse direction. In FIG. 16, a simplest combination of the display panel 301 with such a pixel configuration and a cylindrical lens array 302 is illustrated, and the cylindrical axes (central axes) of cylindrical lenses 303 are combined and arranged in parallel to the longitudinal direction of the display panel 301. In addition, in FIG. 16, X, Y and Z represent coordinate axes in space where the stereoscopic display is arranged. X1 and Y1 represent coordinate axes on the display panel 301. In FIG. 16, an X-axis direction (a transverse direction) in configuration space coincides with a first coordinate axis direction (an X1-axis direction) on the display panel 301, and a Y-axis direction (a longitudinal direction) in configuration space coincides with a second coordinate axis direction (a Y1-axis direction) on the display panel 301. Moreover, in FIG. 16, Px and Py represent a pixel pitch in a shorter direction and a pixel pitch in a longitudinal direction of each of sub-pixels 41R, 41G and 41B, respectively. In FIG. 16, the sub-pixels 41R, 41G and 41B each have a rectangular shape, and the longitudinal direction of the rectangular shape coincides with the Y1-axis direction on the display panel 301.

In the arrangement of a pixel configuration and the cylindrical lens array 302 as illustrated in FIG. 16, a combination of three sub-pixels 41R, 41G and 41B successively arranged in a horizontal direction is used as a unit pixel (1 pixel) for color display. In this case, the horizontal positions of the sub-pixels 41R, 41G and 41B in 1 pixel are different from one another, so the sub-pixels 41R, 41G and 41B of the colors expand in a horizontal direction where the cylindrical lens 303 has refractive power. Therefore, there is an issue that a difference among positions in the horizontal direction of colors of light when the colors reach the eyes of a viewer causes perception of color unevenness. Moreover, a light-shielding section (a black matrix) is arranged between the sub-pixels, so a part not emitting light is perceived as luminance unevenness. The following three methods are known as solutions to such an issue.
(1) Defocusing as described in Makoto Okui, Masaki Kobayashi Jun Arai, and Fumio Okano, "Moire fringe reduction by optical filters in integral three-dimensional imaging on a color flat-panel display", APPLIED OPTICS, Vol. 44, No. 21, 2005, p. 4475-p. 4483
(2) using a diffuser plate as described in Makoto Okui, Masaki Kobayashi Jun Arai, and Fumio Okano, "Moire fringe reduction by optical filters in integral three-dimensional imaging on a color flat-panel display", APPLIED OPTICS, Vol. 44, No. 21, 2005, p. 4475-p. 4483
(3) using a slanted lenticular system as described in Japanese Unexamined Patent Application Publication No. 2005-309374

The method (1) is a method in which refractive power or an optical distance by the cylindrical lens array 302 is changed to cause defocusing, thereby colors from the sub-pixels of the colors are mixed to prevent color unevenness and luminance unevenness. The method (2) is a method in which a diffuser plate is arranged between the display panel 301 and the cylindrical lens array 302 to reduce color unevenness and luminance unevenness. However, in the methods (1) and (2), the sharpness of a displayed image is impaired by defocusing or diffusing light, and such impairment in sharpness of the displayed image may cause a reduction in a stereoscopic effect.

In the method (3), as illustrated in FIG. 18, a plurality of the sub-pixels 41R, 41G and 41B configuring unit pixels for color display are two-dimensionally used, and each unit pixel is configured of a combination of the sub-pixels 41R, 41G and 41B in a diagonal direction. Moreover, the cylindrical lenses 303 are diagonally arranged along an angle of the combination of the sub-pixels. In FIG. 18, in a plane parallel to a display surface of the display panel 301, the cylindrical axes (central axes) C1 of the cylindrical lenses 303 are inclined at an angle θ from a Y-axis direction in configuration space (which coincides with the Y1-axis direction on the display panel 301 in an arrangement in FIG. 18). In addition, in FIG. 18, a combination of adjacent sub-pixels 41R, 41G and 41B to which the same number is assigned (Ri, Gi and Bi, i=1, 2, 3, . . . ) forms a unit pixel for color display. For example, a combination of sub-pixels (R2, G2 and B2) adjacent to one another in a diagonal direction forms a unit pixel. In this method, the sub-pixels 41R, 41G and 41B configuring 1 pixel are arranged in a direction along the cylindrical axis C1 where the cylindrical lenses 303 do not have refractive power, so color unevenness does not occur. Moreover, the colors are mixed in a direction where the cylindrical lenses 303 do not have refractive power, so a change in luminance in a light-shielding section 42 is too small to be perceived, thereby luminance unevenness is substantially eliminated.

In the case of a typical stationary display, the display state in longitudinal and transverse directions of a screen is consistently fixed. For example, in the case of a stationary display of which the screen is landscape-oriented, the display state is consistently fixed to a landscape-oriented display state as illustrated in FIG. 16. However, for example, in a mobile device such as a recent cellular phone, a display in which the display state of a screen of a display section is switchable between a portrait-oriented state (a state where the height of the screen is longer in the aspect ratio of the screen) and a landscape-oriented state (a state where the width of the screen is longer in the aspect ratio of the screen) has been developed. Such switching between a portrait-oriented display state and a landscape-oriented display state is achievable, for example, by independently rotating the whole device or a display section by 90° in a plane parallel to a display surface and also rotating a displayed image by 90°. Now, it is considered that three-dimensional display is performed in a device which is allowed to switch between a portrait-oriented state and a landscape-oriented state.

FIG. 17 illustrates an example in which a stereoscopic display is configured in a second arrangement state where the arrangement direction of the display panel 301 is rotated by 90°, in a plane parallel to the display surface, from an arrangement direction of the display panel 301 in a first arrangement state in FIG. 16. In this case, the second coordinate axis direction (the Y1-axis direction) on the display panel 301 coincides with the X-axis direction (the transverse direction) in configuration space, and the first coordinate axis direction (the X1-axis direction) on the display panel 301 coincides with the Y-axis direction (the longitudinal direction) in configuration space. Therefore, the sub-pixels 41R, 41G and 41B of the colors R, G and B are arranged in horizontal stripes. In other words, as the arrangement of the sub-pixels 41R, 41G and 41B of the colors, the sub-pixels of the same color are arranged in a transverse direction, and sub-pixels of different colors are periodically arranged in the longitudinal direction. In FIG. 17, a simplest combination of the display panel 301 with such a pixel configuration and a cylindrical lens array 302X is illustrated. The combination of the display panel 301 and the cylindrical lens array 302X is arranged so that the cylindrical axis of each cylindrical lens 303X is parallel to the X1-axis direction on the display panel 301 (which coincides with the Y-axis direction in configuration space in the arrangement in FIG. 17).

In the case of a horizontal-striped arrangement as illustrated in FIG. 17, a combination of three sub-pixels 41R, 41G and 41B of the colors R, G and B successively arranged in the longitudinal direction (the Y-axis direction) in configuration space is used as a unit pixel (1 pixel) for color display. In this case, the arrangement directions of the sub-pixels 41R, 41G and 41B of the colors in 1 pixel are orthogonal to a direction where the cylindrical lens 303X has refractive power, so color unevenness does not occur. However, also in this case, a light-shielding section 42 between pixels is present, so luminance unevenness remains.

In the horizontal-striped arrangement, as illustrated in FIG. 19, a slanted lenticular system is used in order to eliminate luminance unevenness. In FIG. 19, the cylindrical axis (a central axis) C2 of the cylindrical lens 303X is inclined at an angle θ from the Y-axis direction in configuration space (which coincides with the X1-axis direction on the display panel 301 in an arrangement in FIG. 19) in a plane parallel to the display surface of the display panel 301. When the slanted lenticular system is used in order to eliminate luminance unevenness, in the case of the horizontal-striped arrangement, a sub-pixel pitch in the horizontal direction is larger than that in the case of a vertical-striped arrangement. In other words, when a pixel pitch in a shorter direction is Px, and a pixel pitch in a longitudinal direction is Py (Py>Px), in the case of the vertical-striped arrangement, the sub-pixel pitch in the horizontal direction is Px, but in the case of the horizontal-striped arrangement, the sub-pixel pitch in the horizontal direction is Py. Therefore, the inclination angle θ of the cylindrical lens 303X increases, thereby it is difficult to separate parallax images in the horizontal direction. In addition, in FIG. 19, a combination of adjacent sub-pixels 41R, 41G and 41B to which the same number is assigned (Ri, Gi and Bi, i=1, 2, 3, . . . ) form a unit pixel for color display. For example, a combination of sub-pixels (R2, G2 and B2) adjacent to one another in a diagonal direction forms a unit pixel.

In a configuration example in FIG. 19, the sub-pixels 41R, 41G and 41B configuring 1 pixel are arranged at intervals of 1 row and 1 column. The inclination angle θ of the cylindrical lens 303X at this time is obtained by θ=tan$^{-1}$(Py/Px). In a typical display panel, the aspect ratio of 1 pixel is 1:1, so Py=3Px is established. Therefore, the inclination angle θ of the cylindrical lens 303X in FIG. 19 is 71.6°. In this case, refractive power is larger in the vertical direction (a Y direction) than in the horizontal direction (an X direction), so the degree of separation of parallax images is larger in the vertical direction than in the horizontal direction. In stereoscopic vision, parallax in the horizontal direction is important, so it is necessary that the inclination angle θ is 45° or less. Therefore, as illustrated in a configuration example in FIG. 20, a method of reducing the inclination angle θ of the cylindrical lens 303X by increasing distances in the vertical direction between the sub-pixels 41R, 41G and 41B configuring 1 pixel is considered.

In a configuration example in FIG. 20, the sub-pixels 41R, 41G and 41B configuring 1 pixel are arranged at intervals of 4 rows and 1 column. Therefore, the inclination angle θ of the cylindrical lens 303X is obtained by θ=tan$^{-1}$(Py/4Px). In this case, the inclination angle θ is 36.9° because of Py=3Px, and the degree of separation of parallax images in the horizontal direction is increased. However, in this case, the distances between the sub-pixels 41R, 41G and 41B are increased, thereby it is difficult to perceive the sub-pixels 41R, 41G and 41B as 1 pixel, so an image different from an image which is supposed to be displayed may be perceived.

Therefore, it is considered difficult to eliminate color unevenness and luminance unevenness without impairing the stereoscopic effect of a stereoscopic image in both cases of the vertical-striped arrangement and the horizontal-striped arrangement as the pixel configuration. In other words, in the stereoscopic display using the lenticular system, the following issues occur. As a first issue, color unevenness and luminance unevenness occur in the case of the vertical-striped arrangement. The first issue is solvable by using the slanted lenticular system. As a second issue, in the case of the horizontal-striped arrangement, the slanted lenticular system is not suitably used, so it is difficult to eliminate luminance unevenness.

In the case where a lenticular system in related art is used to achieve stereoscopic image display which is allowed to switch between a portrait-oriented state and a landscape-oriented state, it is difficult to achieve a device in which color unevenness and luminance unevenness do not occur in both cases where the display is portrait-oriented and landscape-oriented.

On the other hand, in stereoscopic display, it is not necessarily most desirable to use a display panel used for normal two-dimensional display for the purpose of eliminating color unevenness and luminance unevenness or closely arranging pixels in the horizontal direction. For example, it is considered effective to use a display panel with a special pixel configuration as illustrated in FIG. 21 as described in Japanese Unexamined Patent Application Publication No. 2005-316372. In the pixel configuration illustrated in FIG. 21, a sub-pixel of each of a plurality of colors on a first horizontal line and a sub-pixel of same color on a second horizontal line which is adjacent to the first horizontal line are arranged with no interval in the horizontal direction.

When the display panel with the pixel configuration illustrated in FIG. 21 is used, the same effects as those in the slanted lenticular system illustrated in FIG. 18 are obtained without diagonally arranging the cylindrical lens array 302 in order to eliminate color unevenness and luminance unevenness. However, even if such a display panel is used, in the case where the display is rotated by 90°, the light-shielding section 42 is continuously present in the vertical direction, thereby to cause luminance unevenness. As long as the light-shielding section 42 is present in the display panel, it is difficult to achieve a pixel configuration in which sub-pixels of each of the colors are successively arranged in both cases where the display is portrait-oriented and landscape-oriented. Moreover, in the case where the display is rotated by 90° from an arrangement state illustrated in FIG. 21, the pixel pitch in the horizontal direction is increased, so it is difficult to closely arrange pixels in the horizontal direction. Therefore, the slanted lenticular system is not suitable for the arrangement state, and it is difficult to eliminate luminance unevenness.

It is desirable to provide a stereoscopic display which is allowed to achieve favorable stereoscopic vision with less color unevenness and less luminance unevenness in both of a first arrangement state and a second arrangement state where the arrangement directions are different by 90° from each other.

According to an embodiment of the invention, there is provided a stereoscopic display including: a display panel configured to display an image in a first arrangement state and a second arrangement state which are switchable with each other, the second arrangement state being defined as a state where an arrangement direction of the display panel is rotated by 90°, in a plane parallel to a display surface of the display panel, from an arrangement direction of the display panel in the first arrangement; and a lens array device arranged to face a display surface of the display panel and including a plurality of cylindrical lenses configured to be arranged in parallel along a direction according to the arrangement state of the display panel. When the display panel is in the first arrangement state, the plurality of cylindrical lenses are arranged in parallel along a horizontal direction so that axe of the cylindrical lenses are inclined from a vertical direction in the plane parallel to the display surface, and when the display panel is in the second arrangement state, the plurality of cylindrical lenses are arranged in parallel along the horizontal direction so that the axes of the cylindrical lenses are directed to a vertical direction in the plane parallel to the display surface. Moreover, the display panel has a pixel configuration that a plurality of sub-pixels are two-dimensionally arranged, each of the plurality of sub-pixels corresponding to each of a plurality of colors necessary for color display, and a position of each of sub-pixels which are used, as a combination, to configure a unit pixel for color display are changed between in the first arrangement state and in the second arrangement state.

In the stereoscopic display according to the embodiment of the invention, in the display panel, a two-dimensional image is displayed by arbitrarily changing to one of two arrangement states where the arrangement directions of the display panel are different by 90° from each other. When the display panel is in the first arrangement state, a plurality of cylindrical lenses are arranged in parallel so that axe of the cylindrical lenses are inclined from a vertical direction in the plane parallel to the display surface. When the display panel is in the second arrangement state, the plurality of cylindrical lenses are arranged in parallel along a horizontal direction in the plane parallel to the display surface. Moreover, the position of a combination of sub-pixels used as a unit pixel for color display are changed between in the first arrangement state and in the second arrangement state.

In the stereoscopic display according to the embodiment of the invention, as the lens array device, for example, a variable liquid crystal lens array having a liquid crystal layer which is configured to selectively produce a cylindrical-lens effect as an effect of the plurality of cylindrical lenses, the cylindrical-lens effect being allowed to be produced in either one of two different directions by electrically changing a refractive index distribution in a liquid crystal layer is applicable.

In the stereoscopic display according to the embodiment of the invention, the arrangement direction of the cylindrical lenses and the combination of sub-pixels used as a unit pixel for color display are optimized depending on the arrangement state of the display panel, so favorable stereoscopic vision is achievable. In other words, in both of the first arrangement state and the second arrangement state where the arrangement directions of the display panel are by 90° from each other, favorable stereoscopic vision with less color unevenness and less luminance unevenness is achievable.

Other and further objects, features and advantages of the invention will appear more fully from the following description.

DETAILED DESCRIPTION OF THE PREFERRED EMBODIMENTS

Preferred embodiments will be described in detail below referring to the accompanying drawings.

First Embodiment

Whole Configuration of Stereoscopic Display

Figure 3:
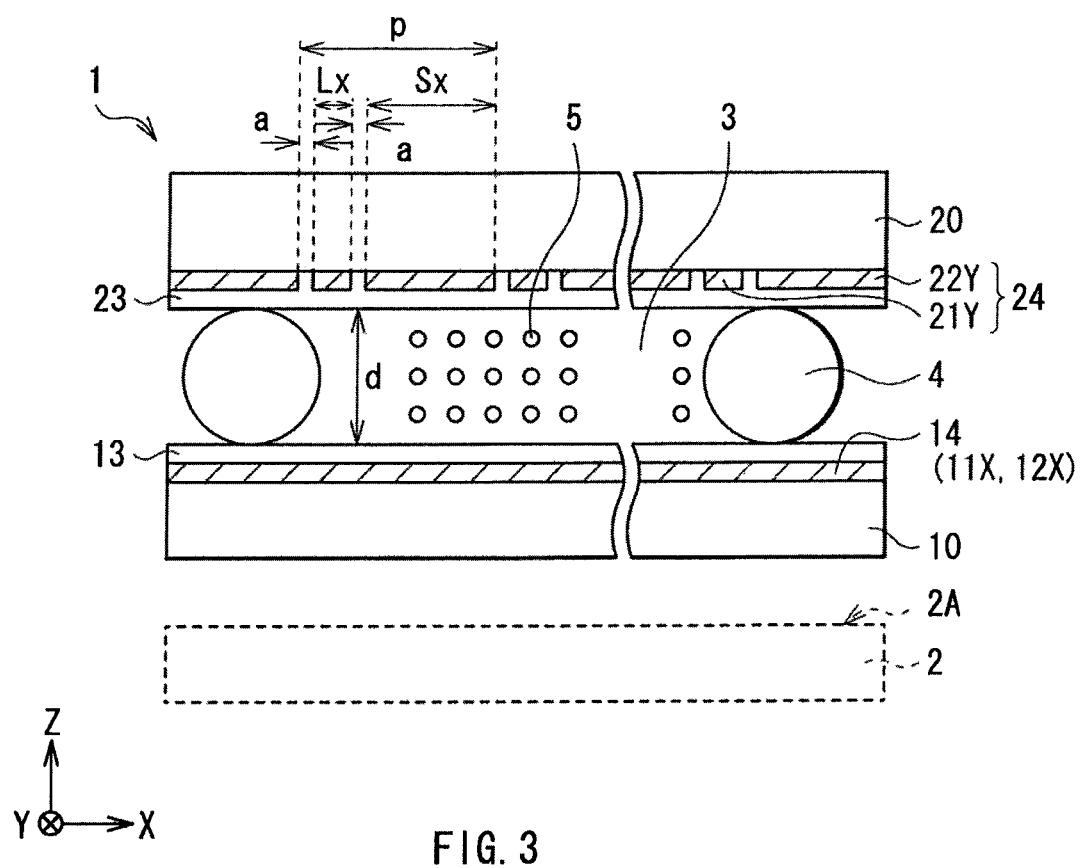
FIG. 3 is a sectional view illustrating a configuration example of the stereoscopic display according to the first embodiment of the invention.

FIG. 3 illustrates a configuration example of a stereoscopic display according to a first embodiment of the invention. The stereoscopic display according to the embodiment includes a display panel 2 which is allowed to display a two-dimensional image and a lens array device 1 which is arranged to face a display surface 2A of the display panel 2 as a whole. The stereoscopic display is allowed to achieve stereoscopic display by changing the display panel 2 to one of two arrangement states, that is, a first arrangement state and a second arrangement state. The second arrangement state is a state where the arrangement direction of the display panel 2 is rotated by 90°, in a plane parallel to the display surface 2A, from the arrangement direction of the display panel 2 in the first arrangement state. Moreover, the stereoscopic display is switchable between two display modes, that is, a two-dimensional display mode and a three-dimensional display mode.

In addition, in the embodiment, X, Y and Z represent coordinate axes in space where the stereoscopic display is arranged, and X1 and Y1 represent coordinate axes on the display panel 2 (on the display surface 2A). Unless otherwise noted, "transverse direction" or "horizontal direction" means a direction parallel to an X-axis direction in configuration space, and "longitudinal direction" or "vertical direction" means a direction parallel to a Y-axis direction in configuration space. Moreover, in the stereoscopic display, stereoscopic vision is achievable in the case where parallax images are separated in the X-axis direction in configuration space and both eyes of a viewer are placed in the X-axis direction in configuration space.

Figure 16:
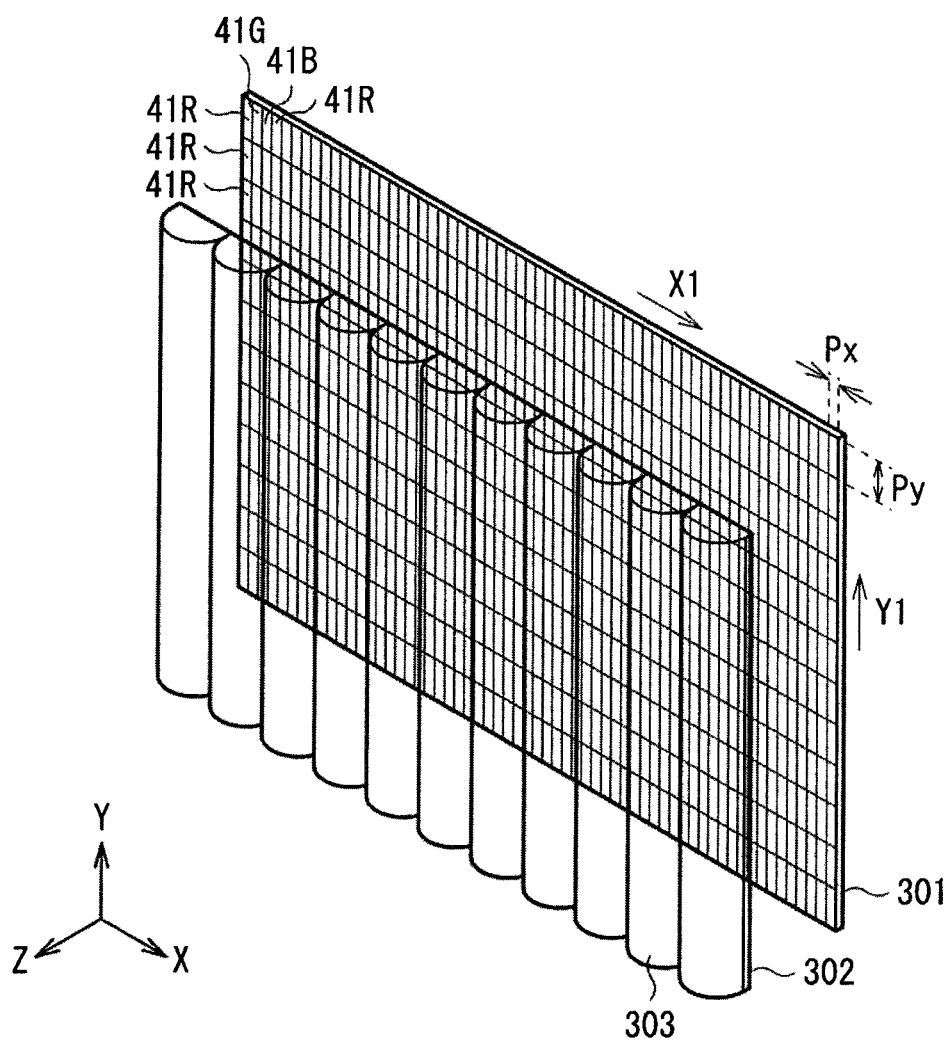
FIG. 16 is an explanatory diagram illustrating a first arrangement example in stereoscopic display by a lenticular system.
Figure 17:
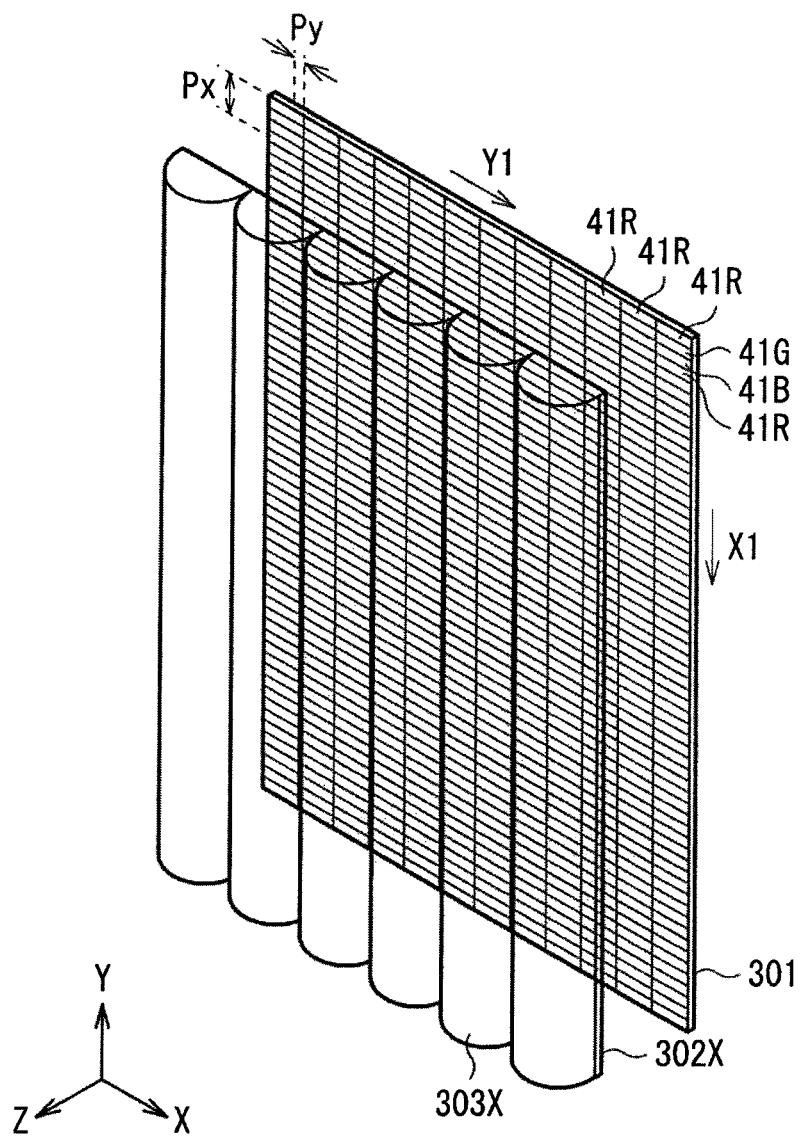
FIG. 17 is an explanatory diagram illustrating a second arrangement example in stereoscopic display by the lenticular system.
Figure 18:
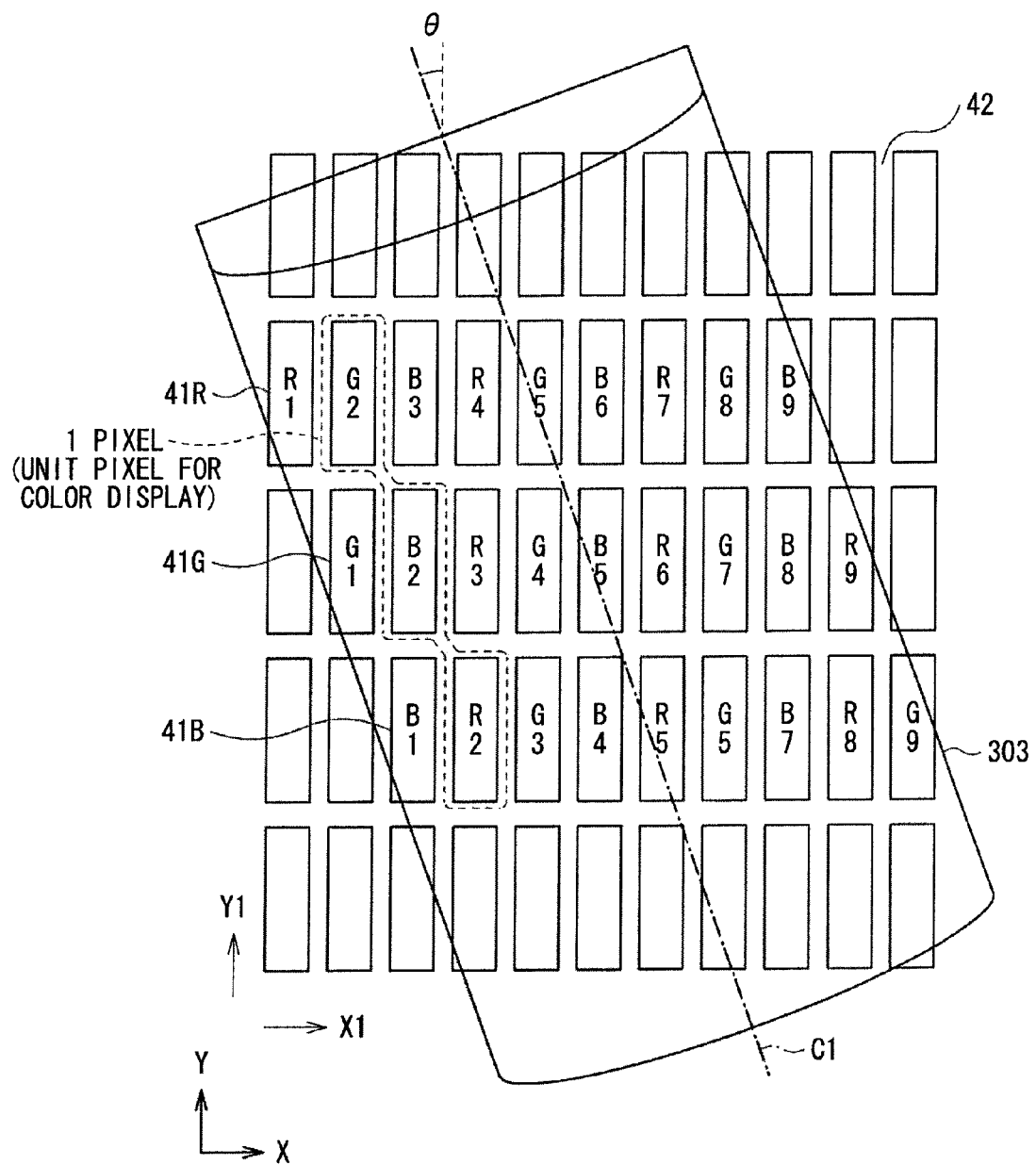
FIG. 18 is an explanatory diagram illustrating an example of a technique of reducing luminance unevenness and color unevenness in related art in a state where cylindrical lenses are diagonally arranged in the case of a vertical-striped pixel arrangement.

Moreover, in the embodiment, the "first arrangement state" means a state where the X-axis direction in configuration space coincides with a first coordinate axis direction (an X1-axis direction) on the display panel 2 and the Y-axis direction in configuration space coincides with a second coordinate axis direction (a Y1-axis direction) on the display panel 2. The state corresponds to an arrangement state illustrated as related art in FIG. 16. Further, the "second arrangement state" means a state where the X-axis direction in configuration space coincides with the second coordinate axis direction (the Y1-axis direction) on the display panel 2 and the Y-axis direction in configuration space coincides with the first coordinate axis direction (X1-axis direction) on the display panel 2. The state corresponds to an arrangement state illustrated as related art in FIG. 17.

The display panel 2 is configured of, for example, a liquid crystal display or an organic EL (Electro-Luminescence) display. The display panel 2 displays a picture based on two-dimensional image data in the case where two-dimensional display is achieved, and the display panel 2 displays a picture based on three-dimensional image data in the case where three-dimensional display is achieved. In addition, the three-dimensional image data is data including a plurality of parallax images corresponding to a plurality of viewing angle directions in three-dimensional display. For example, in the case where binocular three-dimensional display is achieved, the three-dimensional image data is data including parallax images for right-eye display and left-eye display.

The lens array device 1 is a variable lens array by a liquid crystal lens system as will be described later, and is allowed to electrically control on/off states of a lens effect. The lens array device 1 selectively changes the transmission state of a light ray from the display panel 2 by controlling a lens effect in response to a display mode. Also, the lens array device 1 has a liquid crystal layer which is configured to selectively produce a cylindrical-lens effect allowed to be produced in either one of two different directions by electrically changing a refractive index distribution in the liquid crystal layer as will be described later.

In addition, a preferable pixel configuration of the display panel 2 and a preferable arrangement direction of cylindrical lenses in the lens array device 1 will be described in detail later referring to FIGS. 1 and 2.

Whole Configuration of Lens Array Device 1

To describe the basic configuration and effects of the lens array device 1, first, the case where a direction where a lens effect is produced (the arrangement direction of cylindrical lenses) is switched between longitudinal and transverse directions which are different by 90° from each other will be described as an example.

As illustrated in FIG. 3, the lens array device 1 includes a first substrate 10 and a second substrate 20 which face each other with a distance d in between, and a liquid crystal layer 3 arranged between the first substrate 10 and the second substrate 20. The first substrate 10 and the second substrate 20 are transparent substrates made of, for example, a glass material or a resin material. A first electrode group 14 in which a plurality of transparent electrodes extending in a first direction are arranged in parallel at intervals in a width direction is formed on a side facing the second substrate 20 of the first substrate 10. An alignment film 13 is formed on the first substrate 10 with the first electrode group 14 in between. A second electrode group 24 in which a plurality of transparent electrodes extending in a second direction different from the first direction are arranged in parallel at intervals in the width direction is formed on a side facing the first substrate 10 of the second substrate 20. An alignment film 23 is formed on the second substrate 20 with the second electrode group 24 in between.

Figures 13A, 13B:
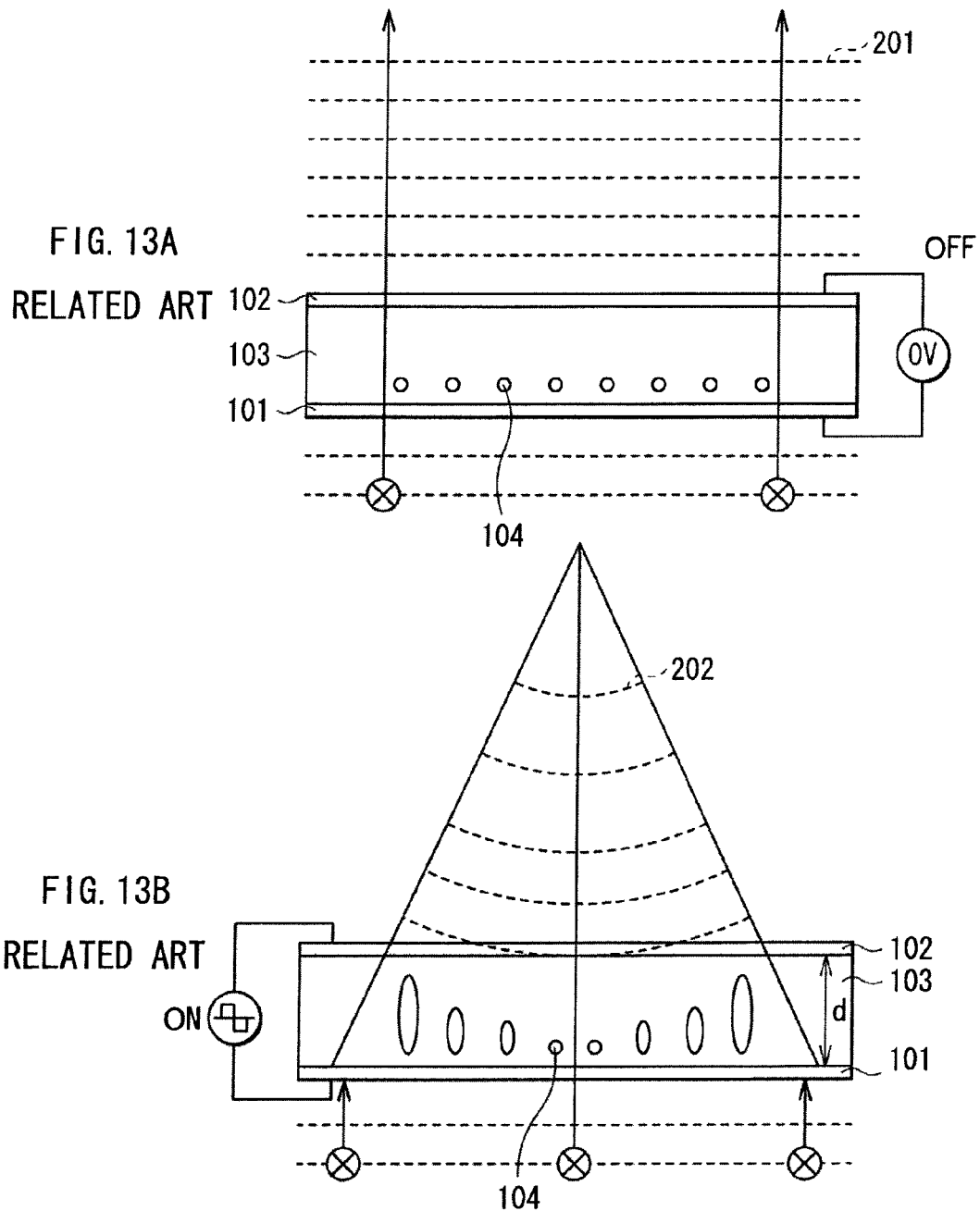
FIGS. 13A and 13B are sectional views illustrating a configuration example of a variable lens array configured of liquid crystal lenses in a state with no lens effect and in a state where the lens effect is produced, respectively.
Figure 14:
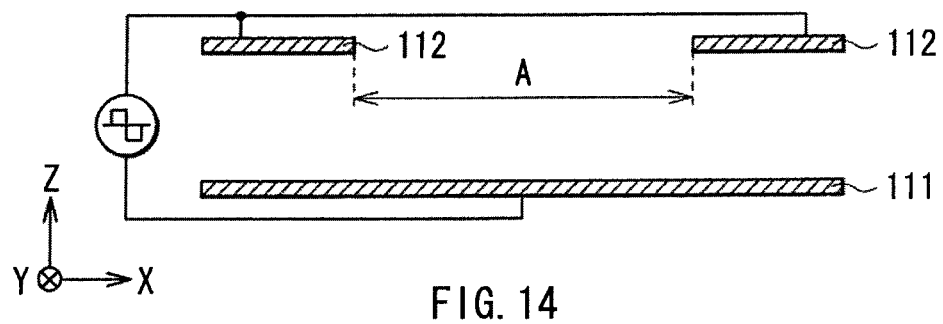
FIG. 14 is a sectional view of a configuration example of an electrode part in the liquid crystal lens illustrated in FIGS. 13A and 13B.

The liquid crystal layer 3 includes liquid crystal molecules 5, and a lens effect is controlled by changing the alignment direction of the liquid crystal molecules 5 in response to voltages applied to the first electrode group 14 and the second electrode group 24. The liquid crystal molecules 5 have refractive index anisotropy, and have, for example, an index ellipsoid configuration with different refractive indices with respect to a transmission light ray in a longitudinal direction and a shorter direction. The liquid crystal layer 3 electrically changes into one of three states, that is, a state with no lens effect, a first lens state and a second lens state in response to a state of the voltages applied to the first electrode group 14 and the second electrode group 24. The first lens state is a state where a lens effect of a first cylindrical lens extending in a first direction is produced. The second lens state is a state where a lens effect of a second cylindrical lens extending in a second direction is produced. In addition, in the lens array device 1, the basic principle of the production of a lens effect is the same as that in a liquid crystal lens illustrated in FIGS. 13A and 13B, except that the lens array device 1 produces a lens effect by switching the direction of the lens effect between two different directions.

Electrode Configuration of Lens Array Device 1

Figure 4:
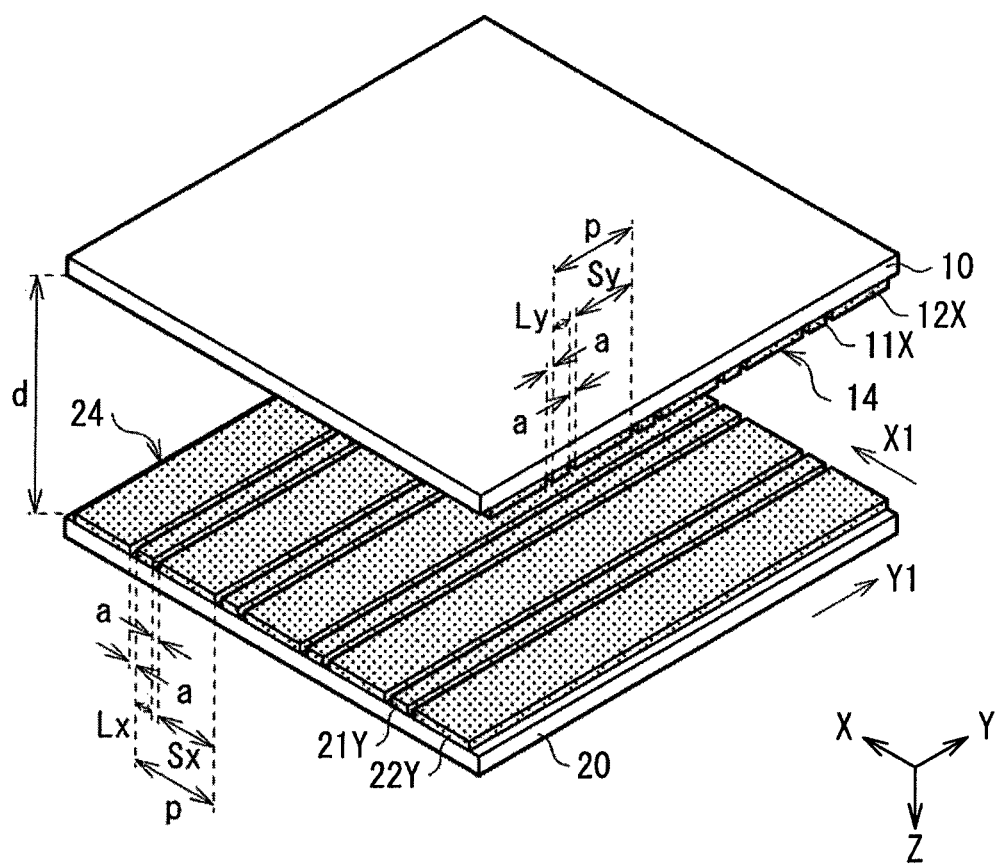
FIG. 4 is a perspective view illustrating a configuration example of an electrode part of a lens array device of the stereoscopic display according to the first embodiment of the invention.
Figure 15:
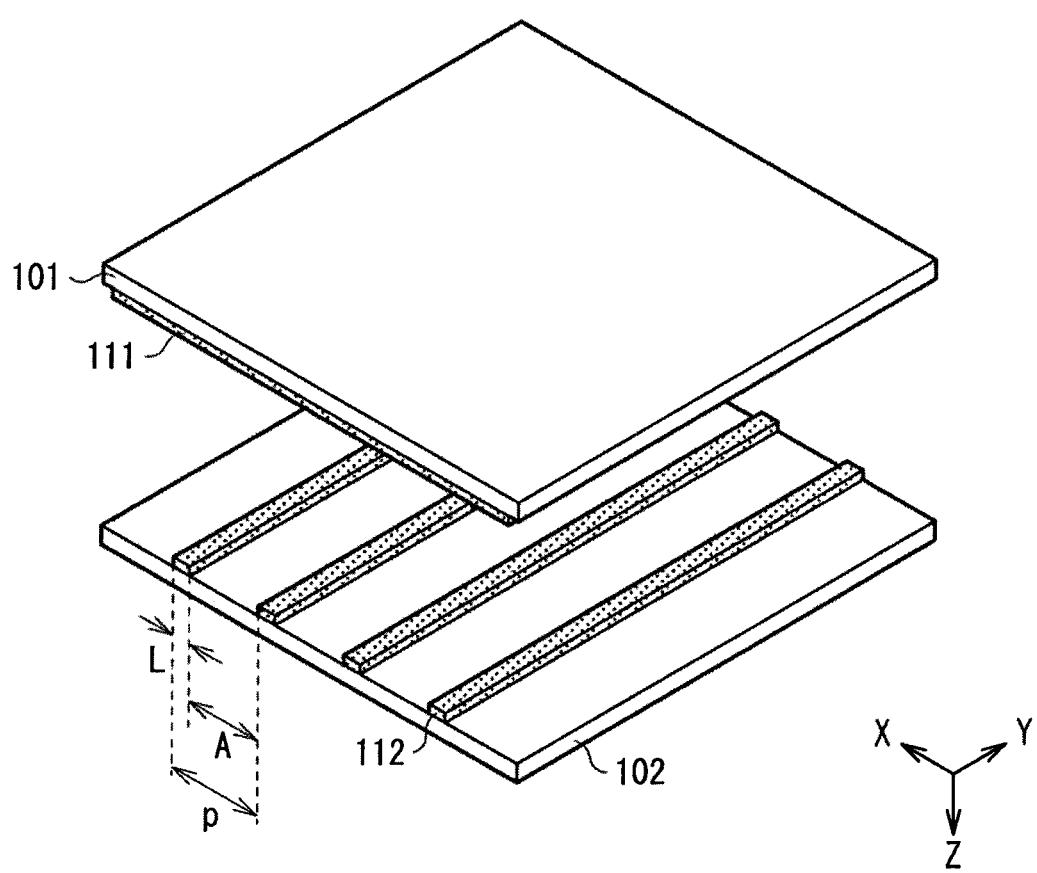
FIG. 15 is a perspective view illustrating a configuration example of the electrode part in the liquid crystal lens illustrated in FIGS. 13A and 13B.

FIG. 4 illustrates a configuration example of an electrode configuration of the lens array device 1. In FIG. 4, to easily recognize a difference from an electrode configuration in related art illustrated in FIG. 15, a state where the lens array device 1 in FIG. 3 is turned upside down, that is, the first substrate 10 is placed on an upper side, and the second substrate 20 is placed on a lower side is illustrated.

The first electrode group 14 has a configuration in which as a plurality of transparent electrodes, electrodes of two kinds having different electrode widths are alternately arranged in parallel. In other words, the first electrode group 14 has a configuration including a plurality of X-direction first electrodes (first electrodes 11X) and a plurality of X-direction second electrodes (second electrodes 12X) which are alternately arranged in parallel. The first electrodes 11X each have a first width Ly, and extend in the first direction (the X1-axis direction). The second electrodes 12X each have a second width Sy larger than the first width Ly, and extend in the first direction. The plurality of the first electrodes 11X are arranged in parallel at intervals corresponding to a lens pitch p of the second cylindrical lens 31X produced as a lens effect. The first electrodes 11X and the second electrodes 12X are arranged at intervals a.

The second electrode group 24 also has a configuration in which as a plurality of transparent electrodes, electrodes of two kinds having different electrode widths are alternately arranged in parallel. In other words, the second electrode group 24 has a configuration including a plurality of Y-direction first electrodes (first electrodes 21Y) and a plurality of Y-direction second electrodes (second electrodes 22Y) which are alternately arranged in parallel. The first electrodes 21Y each have a first width Lx, and extend in the second direction (the Y1-axis direction). The second electrodes 22Y each have a second width Sx larger than the first width Lx, and extend in the second direction. The plurality of first electrodes 21Y are arranged in parallel at intervals corresponding to a lens pitch p of the first cylindrical lens 31Y produced as a lens effect. The first electrodes 21Y and second electrodes 22Y are arranged at intervals a.

Manufacturing Lens Array Device

When the lens array device 1 is manufactured, first, for example, transparent conductive films such as ITO films are formed in predetermined patterns on the first substrate 10 and the second substrate 20 made of, for example, a glass material or a resin material to form the first electrode group 14 and the second electrode group 24, respectively. The alignment films 13 and 23 are formed by a rubbing method in which a polymer compound such as polyimide is rubbed with a cloth in one direction or a method of oblique evaporation of SiO or the like. Thereby, the long axes of the liquid crystal molecules 5 are aligned in one direction. To keep a distance d between the first substrate 10 and the second substrate 20 uniform, a seal material into which a spacer 4 made of a glass material or a resin material is dispersed is printed on the alignment films 13 and 23. Then, the first substrate 10 and the second substrate 20 are bonded together, and the seal material including the spacer 4 is cured. After that, a known liquid crystal material such as a TN liquid crystal or an STN liquid crystal is injected between the first substrate 10 and the second substrate 20 from an opening of the seal material, and then the opening of the seal material is sealed. Then, a liquid crystal composition is heated to its isotropic phase, and then cooled slowly to complete the lens array device 1. In addition, in the embodiment, the larger the refractive index anisotropy Δn of the liquid crystal molecules 5 is, the larger lens effect is obtained, so the liquid crystal material preferably has such a composition. On the other hand, in the case of a liquid crystal composition having large refractive index anisotropy Δn, due to impairing physical properties of the liquid crystal composition to increase viscosity, it may be difficult to inject the liquid crystal composition between the substrates, or the liquid crystal composition may be turned into a state close to a crystal form at low temperature, or an internal electric field may be increased to cause an increase in a drive voltage for a liquid crystal element. Therefore, the liquid crystal material preferably has a composition based on both of manufacturability and the lens effect.

Control Operation of Lens Array Device

Figure 5:
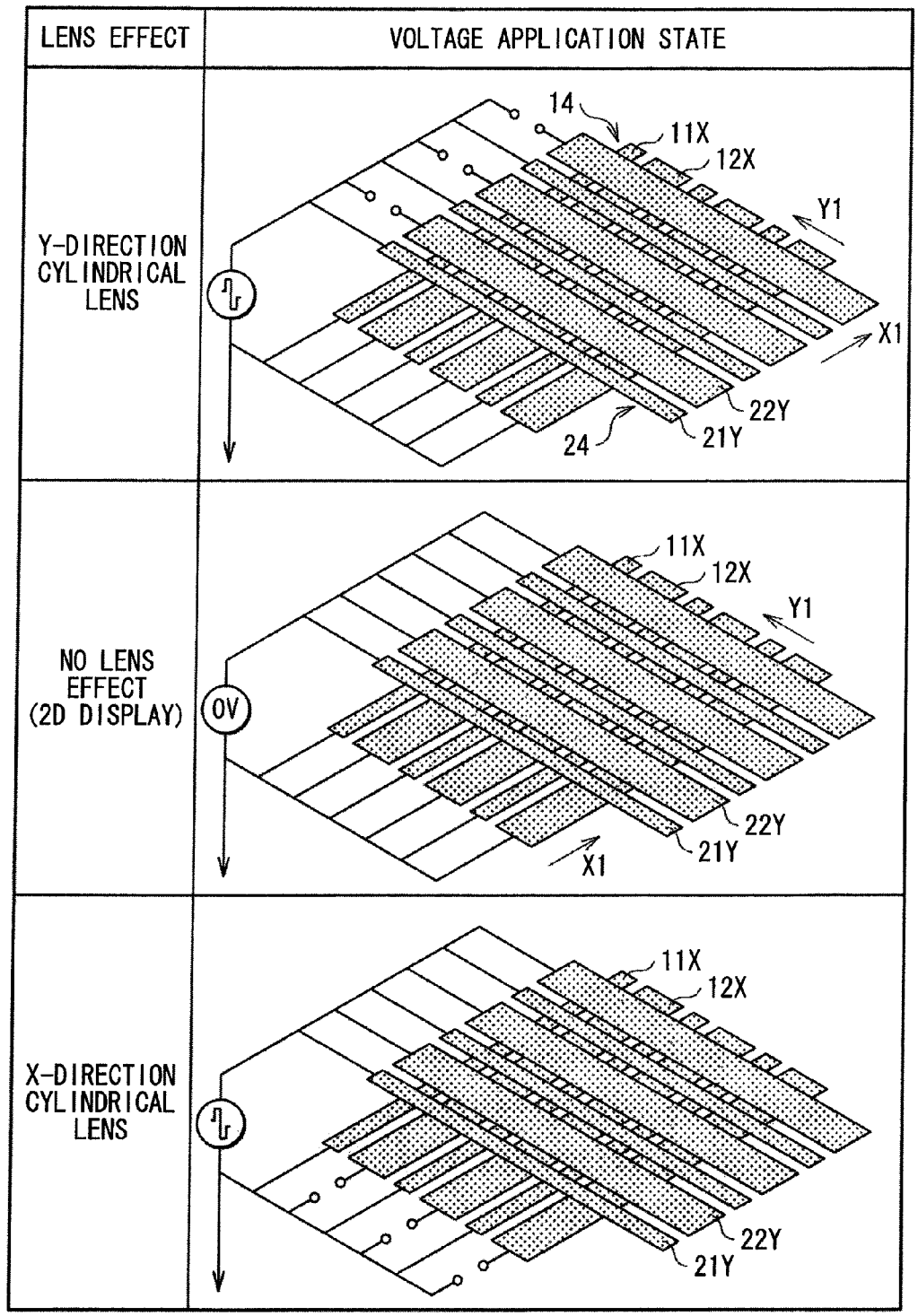
FIG. 5 is an explanatory diagram illustrating a correspondence relationship between a voltage application state and a produced lens effect in the lens array device according to the first embodiment of the invention.
Figure 6:
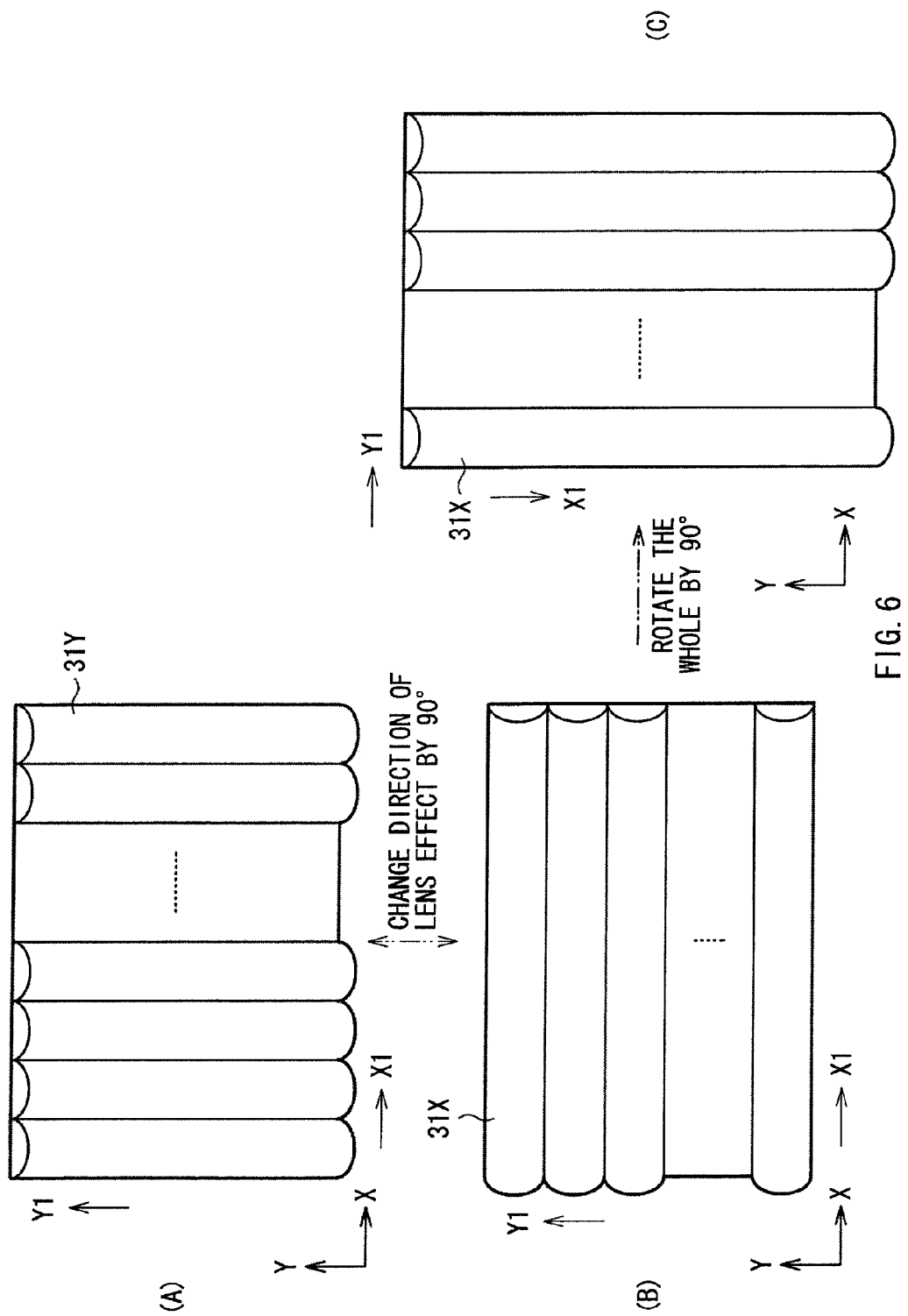
FIG. 6 is an explanatory diagram optically equivalently illustrating switching states of the lens effect in the lens array device according to the first embodiment of the invention through the use of cylindrical lenses.

Next, referring to FIG. 5 and FIG. 6, the control operation of the lens array device 1 (the control operation of a lens effect) will be described below. FIG. 5 illustrates a correspondence relationship between a voltage application state and a produced lens effect in the lens array device 1 with a connection relationship of electrodes. FIG. 6 optically equivalently illustrates a lens effect produced in the lens array device 1.

In the lens array device 1, the liquid crystal layer 3 electrically changes into one of three states, that is, the state with no lens effect, the first lens state and the second lens state according to a state of voltages applied to the first electrode group 14 and the second electrode group 24. The first lens state is a state where the lens effect of the first cylindrical lens extending in the second direction (the Y1-axis direction) is produced. The second lens state is a state where the lens effect of the second cylindrical lens extending in the first direction (the X1-axis direction) is produced.

In the lens array device 1, in the case where the liquid crystal layer 3 is turned into the state with no lens effect, a voltage is turned into a voltage state where a plurality of transparent electrodes of the first electrode group 14 and a plurality of transparent electrodes of the second electrode group 24 have the same potential (0 V) (a state illustrated in a middle section in FIG. 5). In this case, the liquid crystal molecules 5 are uniformly aligned in a predetermined direction determined by the alignment films 13 and 23 by the same principle as that in the case illustrated in FIG. 13A, so the liquid crystal layer 3 is turned into the state with no lens effect.

Moreover, in the case where the liquid crystal layer 3 is turned into the first lens state, a predetermined potential difference, which allows the alignment of the liquid crystal molecules 5 to be changed, between the transparent electrodes above and below the liquid crystal layer 3 is produced in parts corresponding to the first electrodes 21Y of the second electrode group 24. For example, a common voltage is applied to all of the plurality of transparent electrodes of the first electrode group 14. At the same time, a predetermined drive voltage is selectively applied to only the first electrodes 21Y of the plurality of transparent electrodes of the second electrode group 24 (refer to a state illustrated in a top section in FIG. 5). In this case, an electric field distribution in the liquid crystal layer 3 is biased by the same principle as that in the case illustrated in FIG. 13B. More specifically, an electric field in which electric field strength increases according to the drive voltage in parts corresponding to regions where the first electrodes 21Y are formed, and gradually degreases with increasing distance from the first electrodes 21Y is generated. In other words, the electric field distribution is changed so as to produce a lens effect in the first direction (the X1-axis direction). As illustrated in FIG. 6(A), the lens array device 1 is equivalently turned into a lens state where a plurality of first cylindrical lenses (Y-direction cylindrical lenses) 31Y extending in the Y1-axis direction and having refractive power in the X1-axis direction are arranged in parallel along the X1-axis direction. In this case, a voltage is selectively applied to only transparent electrodes (the first electrodes 21Y) in positions corresponding to a lens pitch p of the first cylindrical lenses 31Y in the second electrode group 24.

Moreover, in the case where the liquid crystal layer 3 is turned into the second lens state, a predetermined potential difference, which allows the alignment of the liquid crystal molecules 5 to be changed, between the transparent electrodes above and below the liquid crystal layer 3 is produced in parts corresponding to the first electrodes 11X of the first electrode group 14. For example, a common voltage is applied to all of the plurality of transparent electrodes (the first electrode 21Y and the second electrodes 22Y) of the second electrode group 24. At the same time, a predetermined drive voltage is selectively applied to only the first electrodes 11X of the plurality of transparent electrodes (the first electrodes 11X and the second electrodes 12X) of the first electrode group 14 (refer to a state illustrated in a bottom section in FIG. 5). In this case, an electric field distribution in the liquid crystal layer 3 is biased by the same principle as that in the case illustrated in FIG. 13B. More specifically, an electric field in which electric field strength increases according to the drive voltage in parts corresponding to regions where the first electrodes 11X are formed, and gradually degreases with increasing distance from the first electrodes 11X is generated. In other words, the electric field distribution is changed so as to produce a lens effect in the second direction (the Y-direction). As illustrated in FIG. 6(B), the lens array device 1 is equivalently turned into a lens state where a plurality of second cylindrical lenses (X-direction cylindrical lenses) 31X extending in the X1-axis direction and having refractive power in the Y1-axis direction are arranged in parallel along the Y1-axis direction. In this case, a voltage is selectively applied to only transparent electrodes (the first electrodes 11X) in positions corresponding to a lens pitch p of the second cylindrical lenses 31X in the first electrode group 14.

In the first electrode group 14 and the second electrode group 24, when the electrode widths (Ly, Lx and the like) or the intervals a between electrodes may be equal to each other (such as Ly=Lx), effects of cylindrical lenses having an equal lens pitch p and equal refractive power in different directions are allowed to be produced. On the other hand, when the first electrode group 14 and the second electrode group 24 have different electrode widths or different intervals a between electrodes, effects of cylindrical lenses having different lens pitches are allowed to be produced in the first lens state and the second lens state.

Control Operation of Stereoscopic Display

Figure 7:
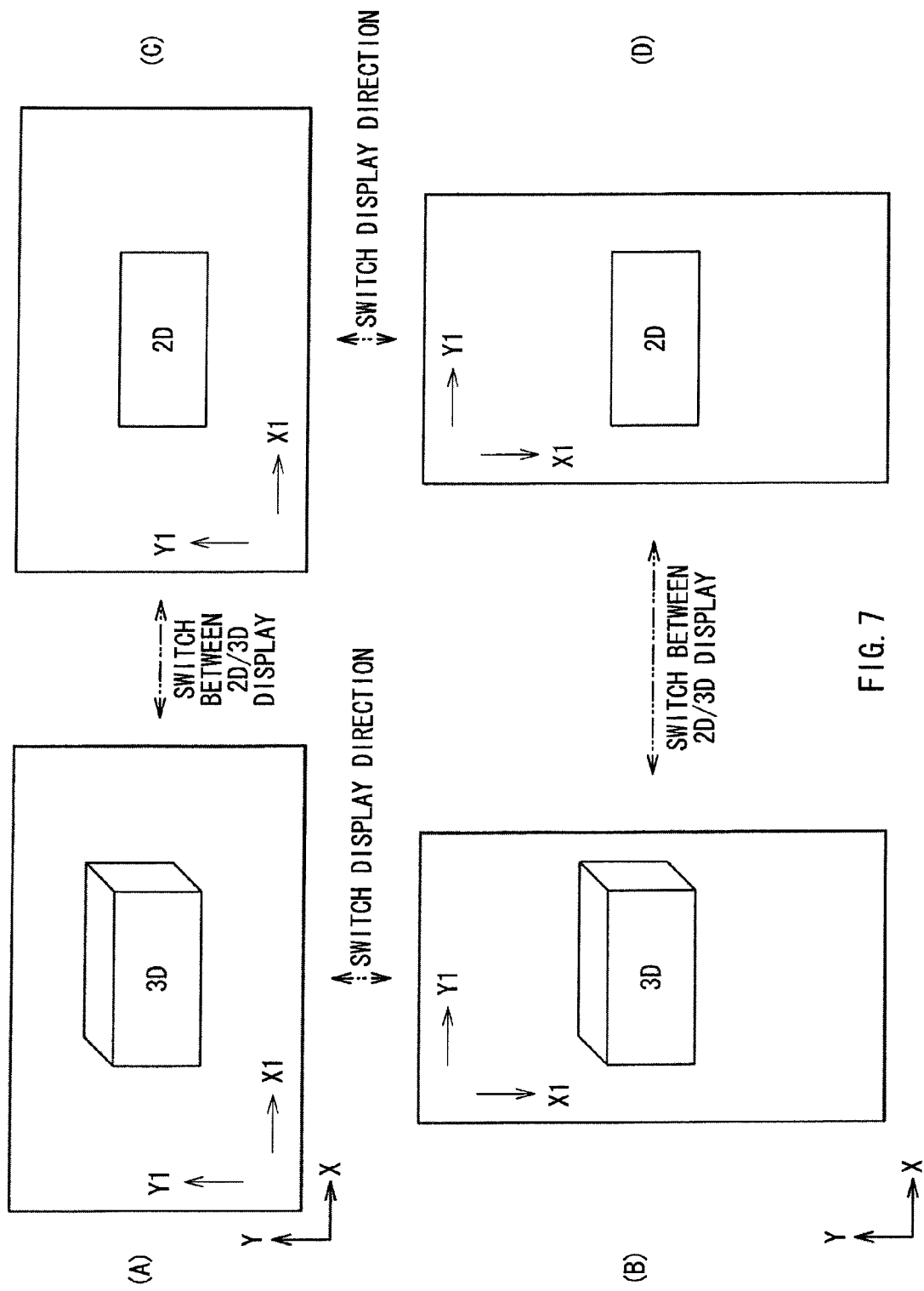
FIG. 7 is an explanatory diagram illustrating an example of switching between display states in the stereoscopic display according to the first embodiment of the invention.

Referring to FIG. 7, the control operation of a stereoscopic display using the lens array device 1 will be described below. FIG. 7 illustrates an example of switching between display states in the stereoscopic display. Herein, the case where, for example, the stereoscopic display is applied to a device in which the display state of a screen is switchable between a portrait orientation state and a landscape orientation state such as a mobile device will be described below as an example. Also, the case where the stereoscopic display is switchable between a two-dimensional display mode and a three-dimensional display mode will be described below as an example.

In the stereoscopic display, electrical switching between two-dimensional display and three-dimensional display is achieved by appropriately switching among the state with no lens effect, the first lens state and the second lens state as described above. For example, when the lens array device 1 is turned into the state with no lens effect, display image light from the display panel 2 is not deflected and passes through as it is, thereby two-dimensional display is achieved. FIG. 7(C) illustrates a screen example in which two-dimensional display is achieved in a state (in a first arrangement state) in which the display state of the screen is landscape-oriented, and FIG. 7(D) illustrates a screen example in which two-dimensional display is achieved in a state (in a second arrangement state) in which the display state of the screen is portrait-oriented.

Moreover, when the lens array device 1 is turned into the first lens state, display image light from the display panel 2 is deflected in the first direction (the X1-axis direction) orthogonal to the second direction (the Y1-axis direction), thereby three-dimensional display where a stereoscopic effect is obtained when both eyes of a viewer are placed along the first direction is achieved. This corresponds to the case where three-dimensional display is achieved in a state (the first arrangement state) in which the display state of the screen is landscape-oriented as illustrated in FIG. 7(A). In this state, a lens effect in a state illustrated in FIG. 6(A) is produced, so when both eyes are placed along a lateral direction (the X-axis direction in configuration space) in a state where the display state of the screen is landscape-oriented, the stereoscopic effect is obtained.

Further, when the lens array device 1 is turned in the second lens state, display image light from the display panel 2 is deflected in the second direction (the Y1-axis direction) orthogonal to the first direction (the X1-axis direction), thereby three-dimensional display where a stereoscopic effect is obtained when both eyes are placed along the second direction is achieved. This corresponds to the case where three-dimensional display is achieved in a state (the second arrangement state) in which the display state of the screen is portrait-oriented as illustrated in FIG. 7(B). In this state, a lens effect in a state illustrated in FIG. 6(C) (a state where a state illustrated in FIG. 6(B) is structurally rotated by 90°) is produced, so when both eyes are placed along a lateral direction (the X-axis direction in configuration space) in a state where the display state of the screen is portrait-oriented, the stereoscopic effect is obtained.

Electrode Configuration Example in which a Lens Effect is Produced in a Diagonal Direction in Lens Array Device 1

In FIGS. 4, 5 and 6, the case where a direction where a lens effect is produced in the lens array device 1 is changed by 90° from a longitudinal direction to a transverse direction or vice versa is described. However, an angle by which the direction is changed is not limited to 90° in the longitudinal and transverse directions, and the direction is allowed to be changed by an arbitrary angle. In other words, one or both of lens effects of the first cylindrical lenses 31Y and the second cylindrical lenses 31X are allowed to be produced in a diagonal direction.

Figure 8:
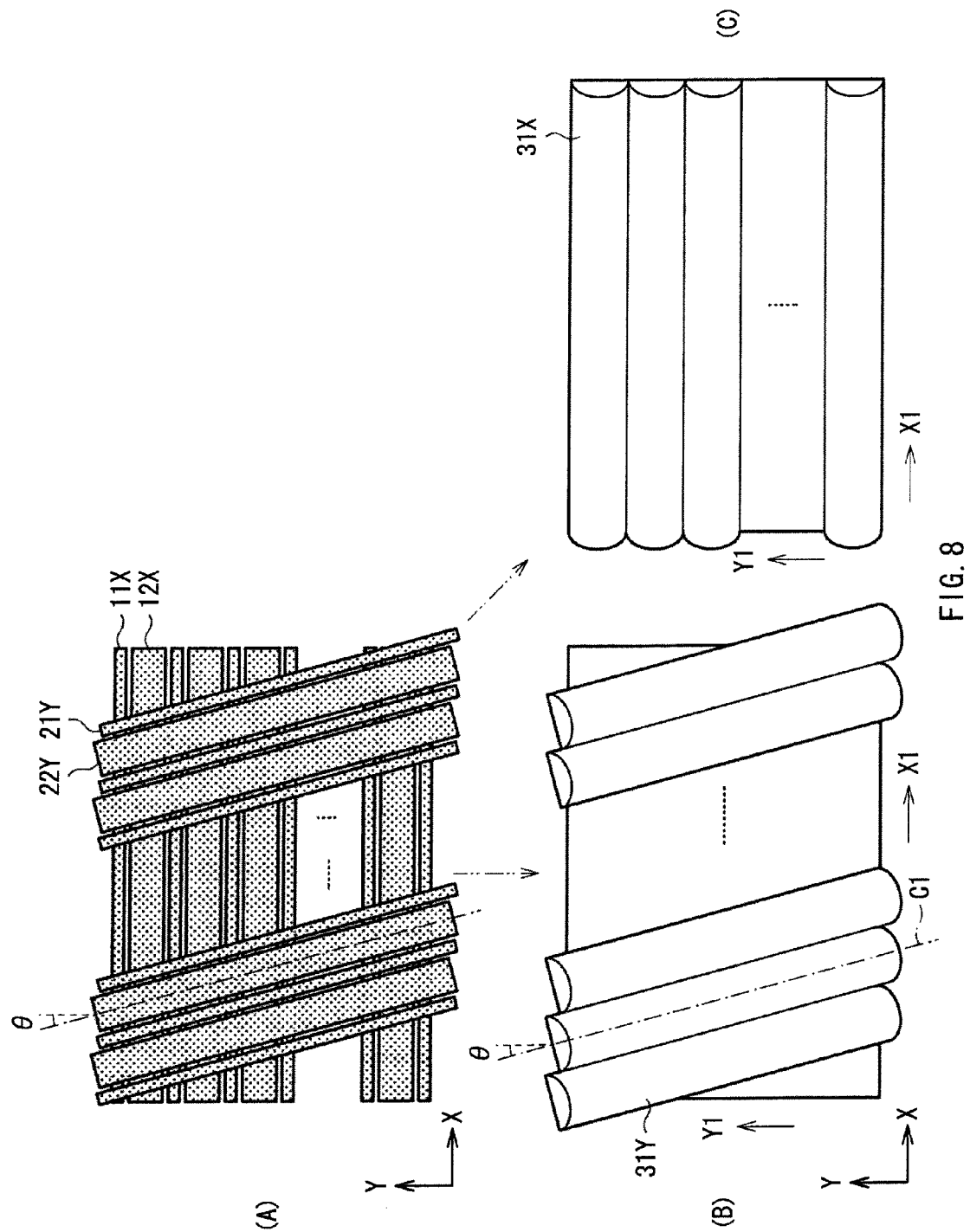
FIG. 8 is an explanatory diagram illustrating a correspondence relationship between an example of an electrode configuration and a produced lens effect in the lens array device according to the first embodiment of the invention.

FIG. 8(A) illustrates an example of an electrode configuration in which the second electrode group 24 (the first electrodes 21Y and the second electrodes 22Y) is inclined by an angle $\theta$ from the longitudinal direction (the Y1-axis direction) in the display surface in contrast with the electrode configuration illustrated in FIGS. 4 and 5. When the second electrode group 24 is inclined in such a manner, as illustrated in FIG. 8(B), in the first lens state, a cylindrical-lens effect as an effect of a cylindrical lens having a central axis (cylindrical axis) C1 inclined at the angle $\theta$ from the Y1-axis direction is allowed to be produced. In other words, equivalently, a cylindrical lens array in which a plurality of first cylindrical lenses 31Y having the central axis (the cylindrical axis) C1 inclined at the angle $\theta$ from the Y1-axis direction are arranged in parallel is configurable. In addition, in the second lens state, as in the case of FIG. 6(B), the lens array device 1 is equivalently turned into a lens state where a plurality of second cylindrical lenses 31X extending in the X1-axis direction and having refractive power in the Y1-axis direction are arranged in parallel along the Y1-axis direction (refer to FIG. 8(C)).

Figure 9:
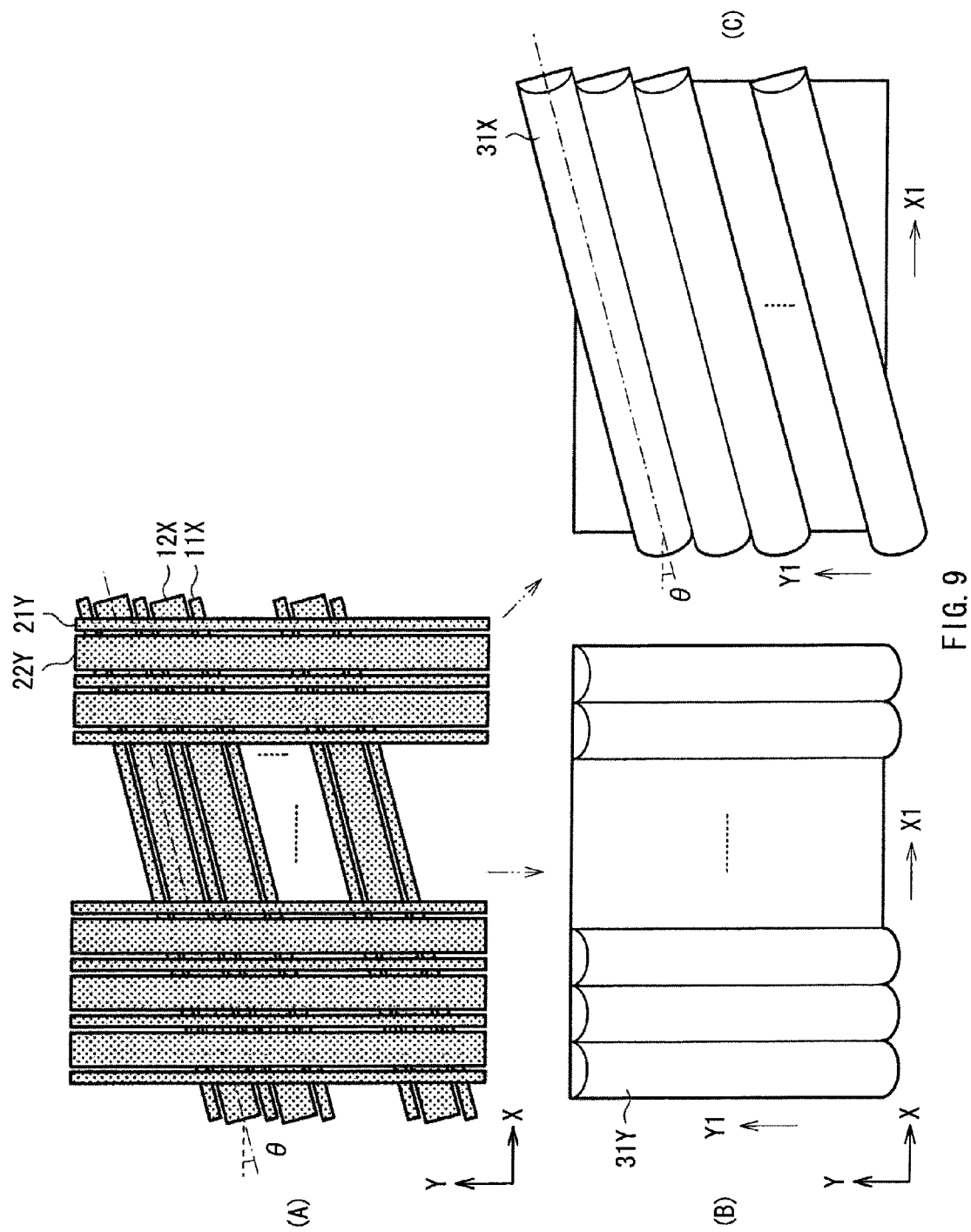
FIG. 9 is an explanatory diagram illustrating a correspondence relationship between another example of the electrode configuration and a produced lens effect in the lens array device according to the first embodiment of the invention.

FIG. 9(A) illustrates an example of an electrode configuration in which the first electrode group 14 (the first electrodes 11X and the second electrodes 12X) is inclined at the angle $\theta$ from the transverse direction (the X1-axis direction) in the display surface in contrast with the electrode configuration illustrated in FIGS. 4 and 5. When the first electrode group 14 is inclined in such a manner, as illustrated in FIG. 9(C), as the second lens state, a cylindrical-lens effect as an effect of a cylindrical lens having a central axis (cylindrical axis) C2 inclined at the angle $\theta$ from the X1-axis direction is allowed to be produced. In other words, equivalently, a cylindrical lens array in which a plurality of second cylindrical lenses 31X having the central axis (cylindrical axis) C2 inclined at the angle $\theta$ from the X1-axis direction are arranged in parallel is configurable. In addition, in the first lens state, as in the case of FIG. 6(A), the lens array device 1 is equivalently turned into a lens state where a plurality of first cylindrical lenses 31Y extending in the Y1-axis direction and having refractive power in the X1-axis direction are arranged in parallel along the X1-axis direction (refer to FIG. 9(B)).

Pixel configuration of display panel 2 and arrangement directions of cylindrical lenses 31X and 31Y Next, a preferable relationship between the arrangement state of the display panel 2 and a combination of sub-pixels used as a unit pixel for color display in the embodiment will be described below. At the same time, a preferable relationship between the arrangement state of the display panel 2 and the arrangement directions of the cylindrical lenses 31X and 31Y in the lens array device 1 will be described below.

Figure 1:
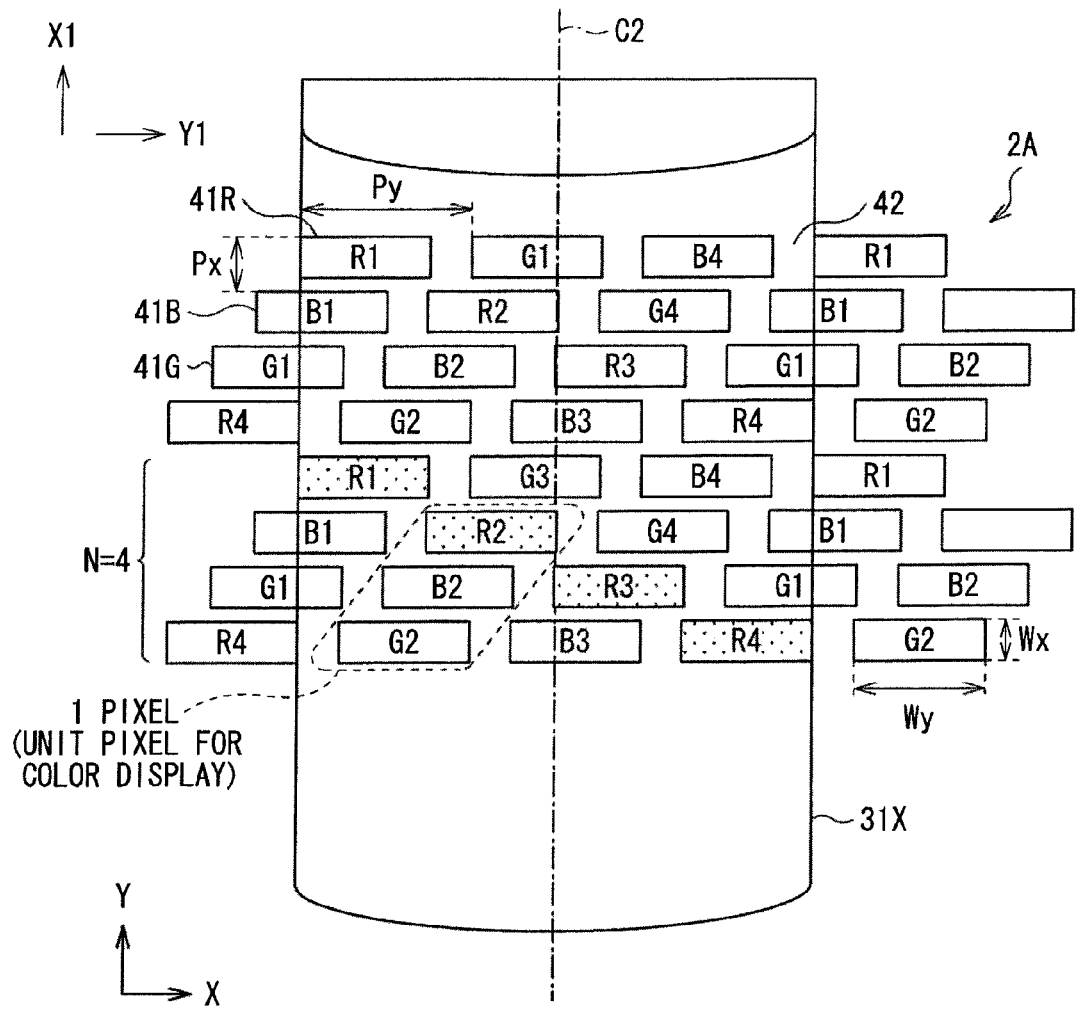
FIG. 1 is an explanatory diagram illustrating a relationship between the arrangement of pixels and the arrangement of cylindrical lenses in a second arrangement state in a stereoscopic display according to a first embodiment of the invention.

FIG. 1 illustrates a relationship between a pixel arrangement of the display panel 2 in the second arrangement state and an arrangement of the second cylindrical lens 31X in the lens array device 1. FIG. 2 illustrates a relationship between a pixel arrangement of the display panel 2 in the first arrangement state and an arrangement of the first cylindrical lens 31Y in the lens array device 1. In the case where the display panel 2 is in the first arrangement state, as illustrated in FIG. 2, in the lens array device 1, a plurality of the first cylindrical lenses 31Y are arranged in parallel so that axe of the first cylindrical lenses 31Y are inclined from a vertical direction in the plane parallel to the display surface 2A. Moreover, in the case where the display panel 2 is in the second arrangement state, as illustrated in FIG. 1, a plurality of the second cylindrical lenses 31X are arranged in parallel along the horizontal direction so that the axes of the second cylindrical lenses 31X are directed to a vertical direction in the plane parallel to the display surface 2A. In addition, in the lens array device 1, to switch a lens effect between such two directions, an electrode configuration as illustrated in FIG. 8(A) may be used. In other words, in the first arrangement state, a lens effect in a state illustrated in FIG. 8(B) is produced. In the second arrangement state, a lens effect in a state illustrated in FIG. 8(C) is produced, and the lens array device 1 is structurally rotated by 90° together with the display panel 2, thereby the second cylindrical lenses 31X are arranged in parallel along the X-axis direction in configuration space.

The display panel 2 has a pixel configuration in which a plurality of sub-pixels of a plurality of colors necessary for color display are two-dimensionally arranged. In the display panel 2, the position of the combination of sub-pixels used as a unit pixel for color display is changed between in the first arrangement state and in the second arrangement state. In configuration examples in FIGS. 1 and 2, sub-pixels 41R, 41G and 41B of three colors R (red), G (green) and B (blue) are combined to form 1 pixel for color display. As the pixels of the display panel 2, a plurality of pixels are arranged corresponding to a pitch p of the cylindrical lens 31X or 31Y formed by the lens array device 1. In a three-dimensional display mode, the number of light rays (the number of lines of sight) in three-dimensional display equal to the number of pixels corresponding to the pitch p of the cylindrical lens 31X or 31Y is provided.

In the embodiment, in the first arrangement state (refer to FIG. 2), in the display panel 2, a pixel configuration in which the sub-pixels 41R, 41G and 41B of the colors are cyclically arranged along a vertical line (in the Y-axis direction) is formed. Moreover, in the second arrangement state (refer to FIG. 1), a pixel configuration in which the sub-pixels 41R, 41G and 41B are cyclically arranged in a horizontal line (in the X-axis direction) is formed. At the same time, in the second arrangement state, a pixel arrangement in which a sub-pixel of a color on a first horizontal line and a sub-pixel of same color on a second horizontal line adjacent to the first horizontal line are arranged with no interval in the horizontal direction and overlap with each other is formed. For example, in FIG. 1, attention is given to shaded and highlighted red sub-pixels 41R indicated by reference numerals R1, R2, R3 and R4. Thereby, it is obvious that the sub-pixels of each color are arranged successively in the horizontal direction with no interval.

Figure 2:
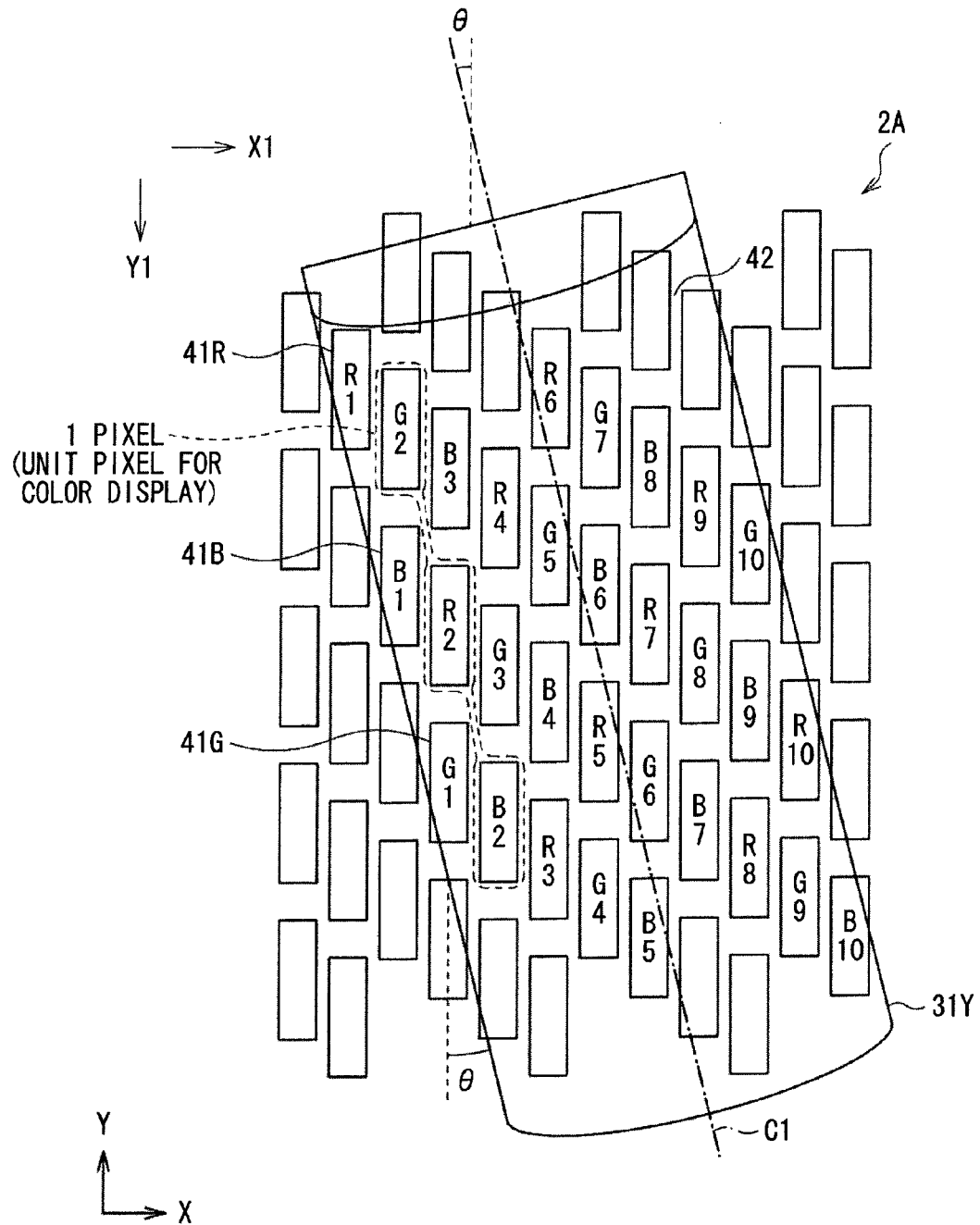
FIG. 2 is an explanatory diagram illustrating a relationship between the arrangement of pixels and the arrangement of cylindrical lenses in a first arrangement state in the stereoscopic display according to the first embodiment of the invention.

In FIGS. 1 and 2, a combination of the sub-pixels 41R, 41G and 41B to which the same number is assigned (Ri, Gi and Bi, i=1, 2, 3, . . . ) forms a unit pixel for color display. In each of FIGS. 1 and 2, for example, a combination of sub-pixels (R2, G2 and B2) adjacent to one another in a diagonal direction forms a unit pixel.

In other words, in the second arrangement state, as illustrated in FIG. 1, a combination of the sub-pixels 41R, 41G and 41B of different colors arranged in respective different horizontal lines is used as a unit pixel for color display. In the first arrangement state, as illustrated in FIG. 2, a combination of the sub-pixels 41R, 41G and 41B of different colors arranged in respective different vertical lines is used as a unit pixel for color display.

Figure 19:
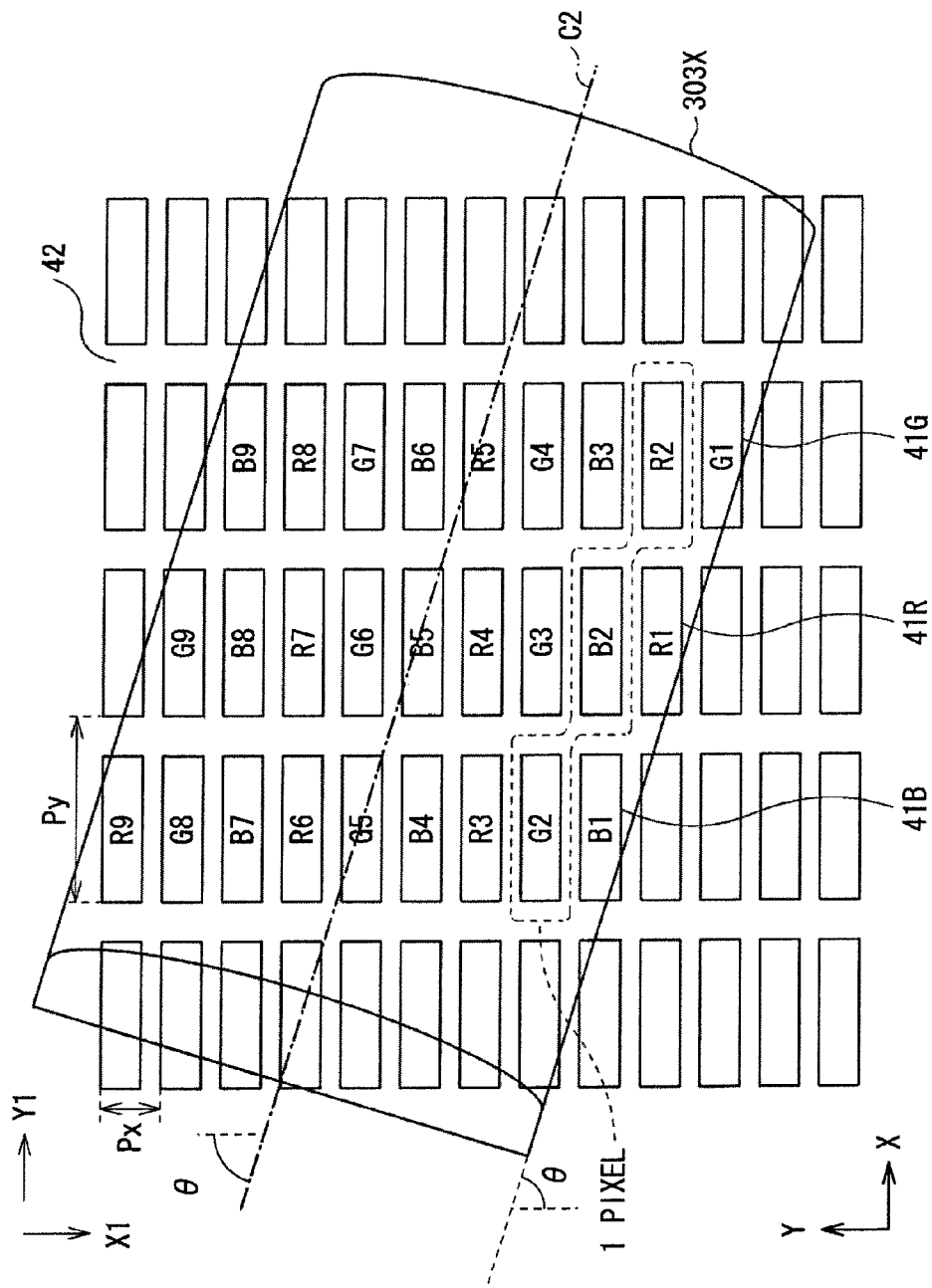
FIG. 19 is an explanatory diagram illustrating an example of the technique of reducing luminance unevenness and color unevenness in related art in a state where cylindrical lenses are diagonally arranged in the case of a horizontal-striped pixel arrangement.
Figure 20:
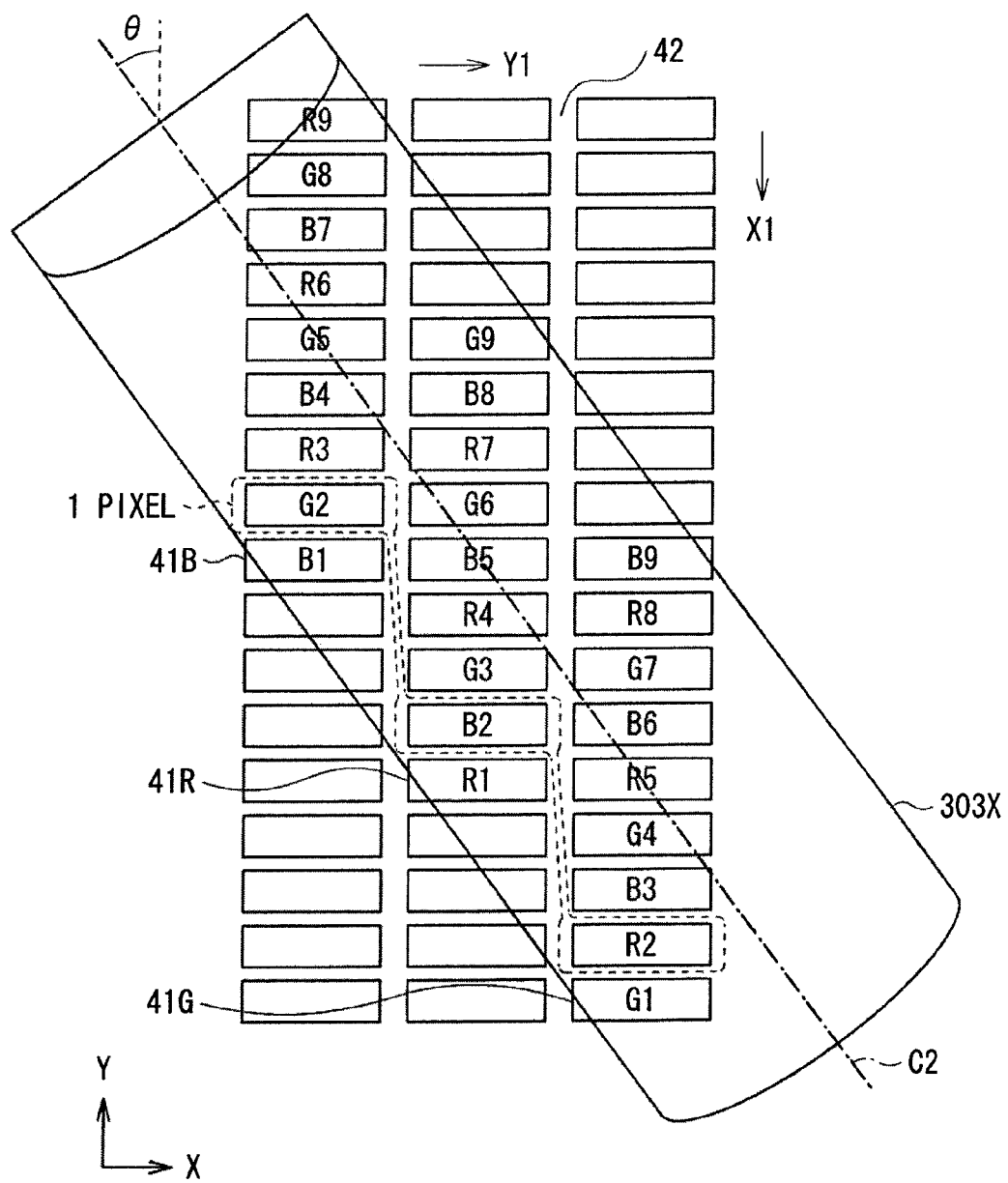
FIG. 20 is an explanatory diagram illustrating a state where cylindrical lenses are diagonally arranged so as to have a smaller inclination angle than that in an arrangement in FIG. 19.
Figure 21:
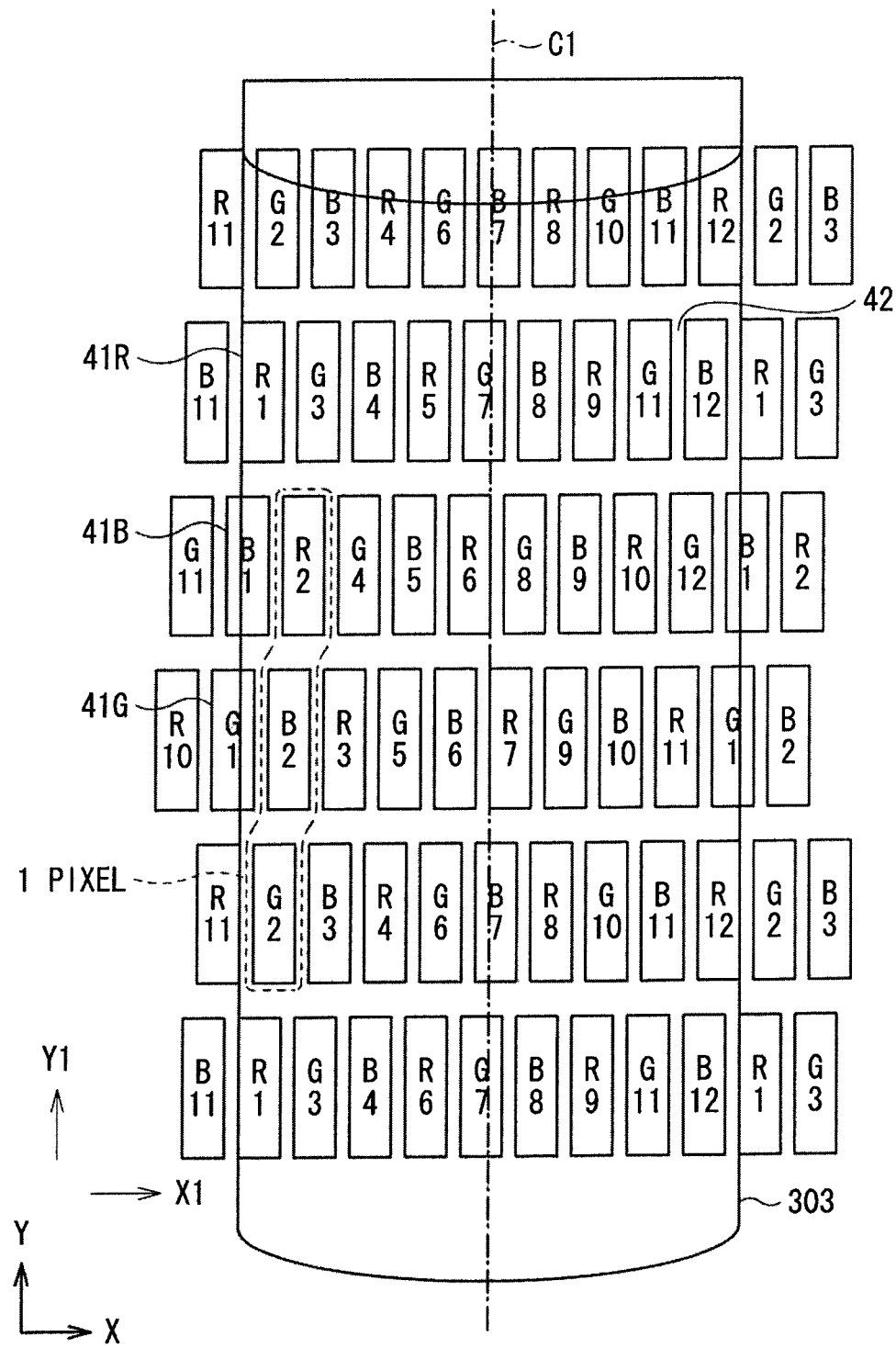
FIG. 21 is an explanatory diagram illustrating an example of a technique of reducing luminance unevenness and color unevenness in related art in a state where pixels are suitably arranged for stereoscopic display.

In such a pixel configuration, in the second arrangement state, the sub-pixels 41R, 41G and 41B of the colors are connected so as to partially overlap with one another, and the light-shielding section 42 is present discontinuously in the vertical direction. Therefore, in the second arrangement state, color unevenness and luminance unevenness are eliminated without diagonally arranging the second cylindrical lens 31X. Thereby, in the second arrangement state, unlike a configuration example in FIG. 19, an issue in a slanted lenticular system that it is difficult to separate parallax images due to a large inclination angle of the second cylindrical lens 31X does not occur.

On the other hand, in the first arrangement state, the first cylindrical lens 31Y is inclined to use the slanted lenticular system, thereby color unevenness and luminance unevenness are allowed to be eliminated. In this case, when the inclination angle θ of the first cylindrical lens 31Y is too large, an issue that it is difficult to separate parallax images occurs as a disadvantage of the slanted lenticular system. Therefore, the inclination angle θ preferably satisfies the following conditions.

In the display panel 2, the sub-pixels 41R, 41G and 41B of the colors each have a rectangular shape with the same size. Then, the display panel 2 has a pixel arrangement in which in the first arrangement state (refer to FIG. 2), the longitudinal direction of each of the sub-pixels 41R, 41G and 41B is along the vertical direction, and in the second arrangement state (refer to FIG. 1), the shorter direction of each of the sub-pixels 41R, 41G and 41B is along the vertical direction. At this time, pixel pitches in the shorter direction and the longitudinal direction of each of the sub-pixels 41R, 41G and 41B are defined as Px and Py, respectively. Moreover, pixel widths in the shorter direction and the longitudinal direction are defined as Wx and Wy, respectively. Further, in the second arrangement, the number of sub-pixels 41R, 41G and 41B in the vertical direction configuring "a three-dimensional pixel" as a unit pixel for a stereoscopic image is N. The "three-dimensional pixel" is configured of a group of pixels of which the number is equal to the number of parallaxes in stereoscopic display. In the second arrangement state, to successively arrange the sub-pixels 41R, 41G or 41B of the same color in the horizontal direction with no interval and without overlapping with one another, it is necessary for the pixel width Wy in the longitudinal direction to satisfy the following relational expression:

$$Wy = Py(1 - 1/N)$$

In the first arrangement state, it is preferable that the inclination angle θ of the first cylindrical lens 31Y is 45° or less and a distance between sub-pixels is small as a pixel configuration. In a pixel arrangement illustrated in FIG. 2, when a combination of the sub-pixels 41R, 41G and 41B (R1, G2 and B3) is used as a unit pixel for color display, the inclination angle θ is obtained by the following expression:

$$\theta = \tan^{-1}((Py - Wy)/Px)$$

In this case, as described above, the pixel width Wy in the longitudinal direction is obtained by Wy=Py(1−1/N), so the inclination angle θ is 53.1° which is too large. Therefore, as the combination of the sub-pixels 41R, 41G and 41B, a combination of the sub-pixels (R1, G1 and B1) which do not overlap with one another in the vertical direction and are arranged at a small distance from one another is preferable. At this time, the inclination angle θ of the first cylindrical lens 31Y is obtained by the following expression:

$$\theta = \tan^{-1}(Px/Py(1+1/N))$$

At this time, in the case of Py=3Px, the inclination angle θ is 14.9°, which is a value at which a state where the degree of separation of parallax images is large in the horizontal direction is achievable. In other words, the inclination angle θ has a sufficient value to achieve stereoscopic vision in the horizontal direction.

As described above, in the embodiment, the arrangement direction of the cylindrical lenses and the combination of sub-pixels used as a unit pixel for color display are optimized depending on the arrangement state of the display panel 2, so favorable stereoscopic vision is achievable. In other words, in both of the first arrangement state and the second arrangement state where the arrangement directions of the display panel 2 are different by 90° from each other, natural stereoscopic vision with less color unevenness and less luminance unevenness is achievable. Thereby, in the case where the stereoscopic display according to the embodiment is applied to a device in which a display section is switchable between a portrait orientation state and a landscape orientation state such as a mobile display used in, for example, a cellular phone, a digital camera or the like, stereoscopic vision without unevenness in the longitudinal direction and the transverse direction is achievable.

Second Embodiment

Next, a stereoscopic display according to a second embodiment of the invention will be described below. Like components are denoted by like numerals as of the stereoscopic display according to the first embodiment, and will not be further described.

In the stereoscopic display according to the embodiment, the display panel 2 has a different pixel configuration from that of the stereoscopic display according to the first embodiment. The arrangement angle of the cylindrical lens by the lens array device 1 corresponds to the pixel configuration. Other basic configurations of the stereoscopic display according to the second embodiment are the same as those of the stereoscopic display according to the first embodiment.

Figure 10:
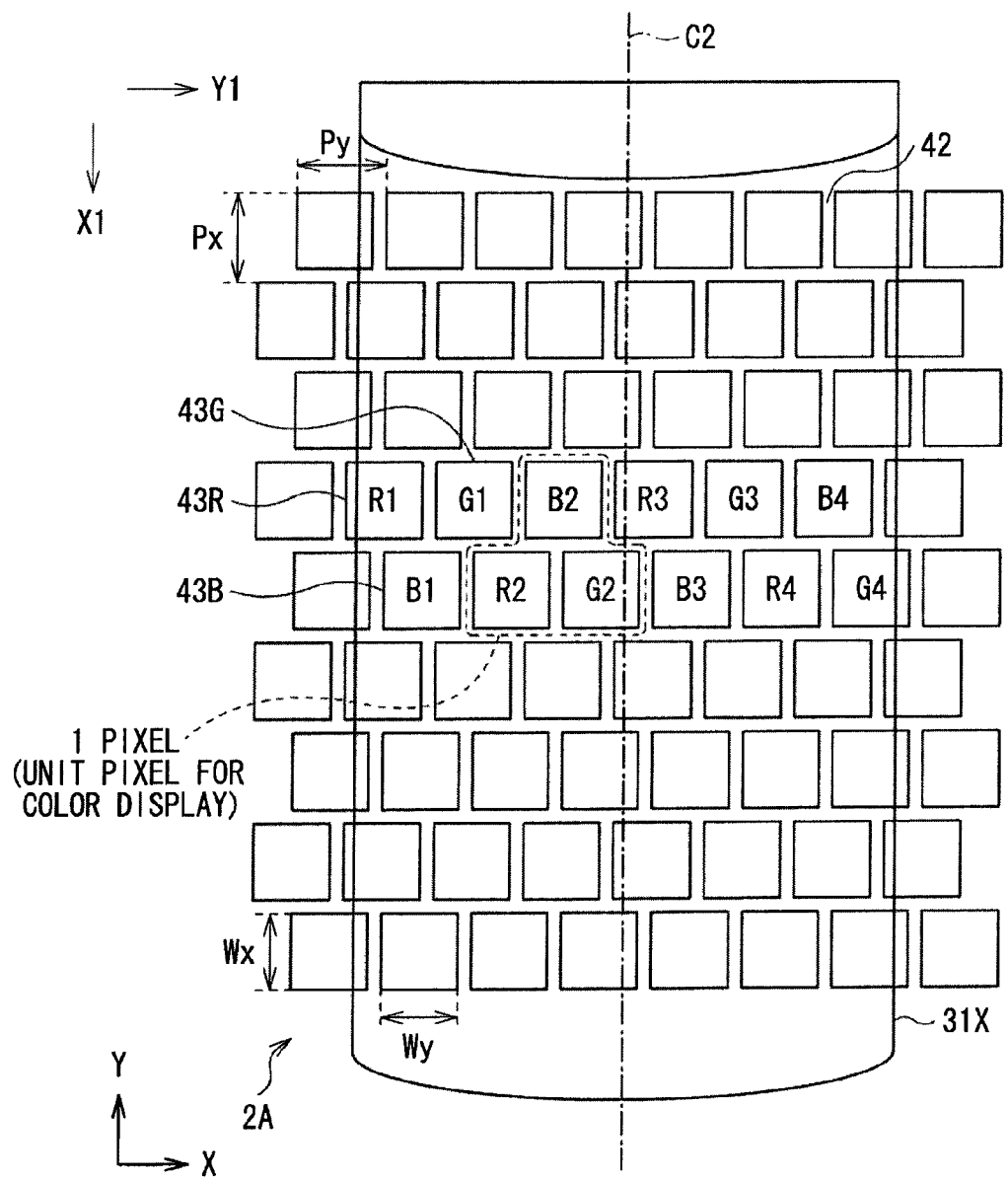
FIG. 10 is an explanatory diagram illustrating a relationship between the arrangement of pixels and the arrangement of cylindrical lenses in a second arrangement state in a stereoscopic display according to a second embodiment of the invention.
Figure 11:
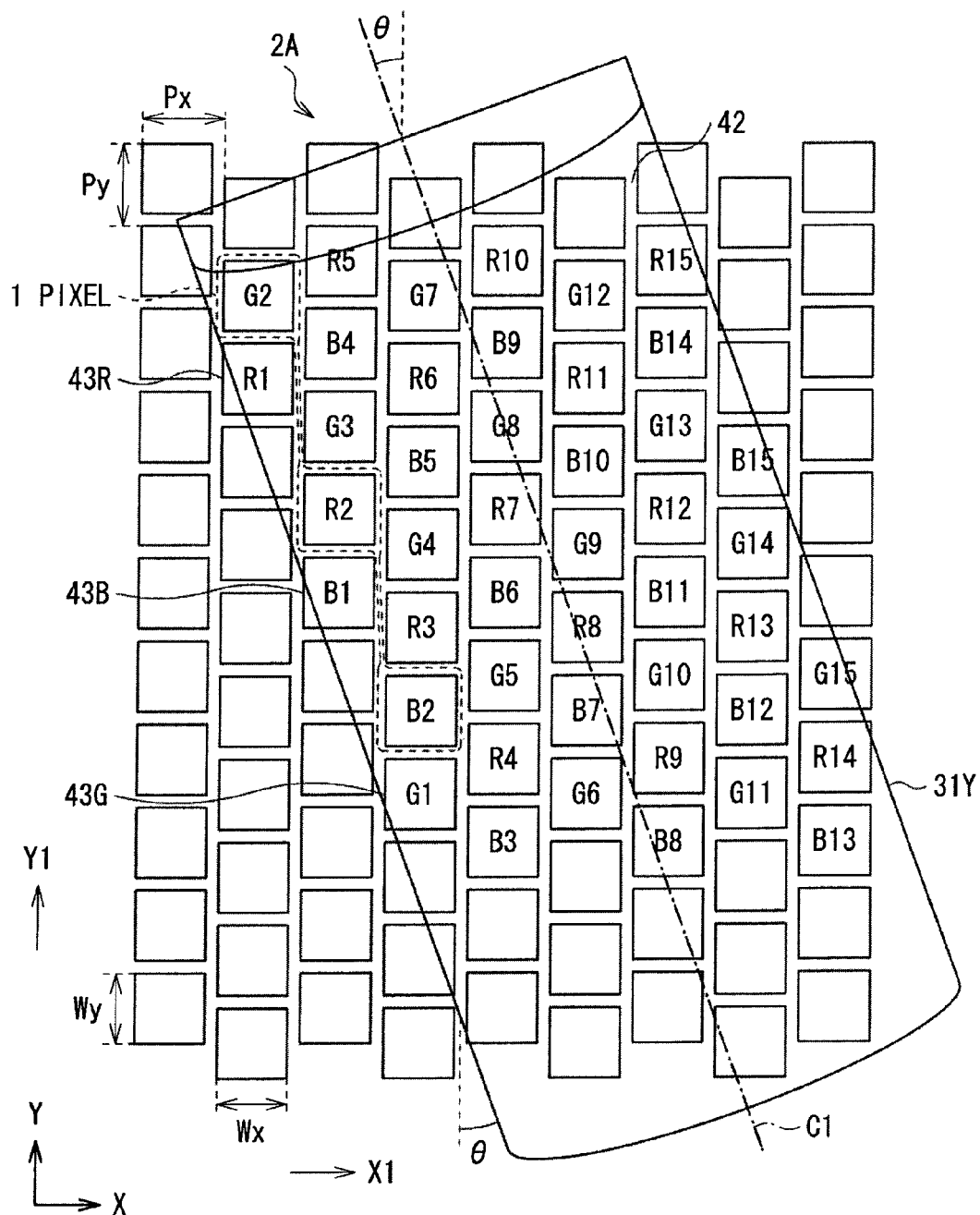
FIG. 11 is an explanatory diagram illustrating a relationship between the arrangement of pixels and the arrangement of cylindrical lenses in a first arrangement state in the stereoscopic display according to the second embodiment of the invention.
Figure 12:
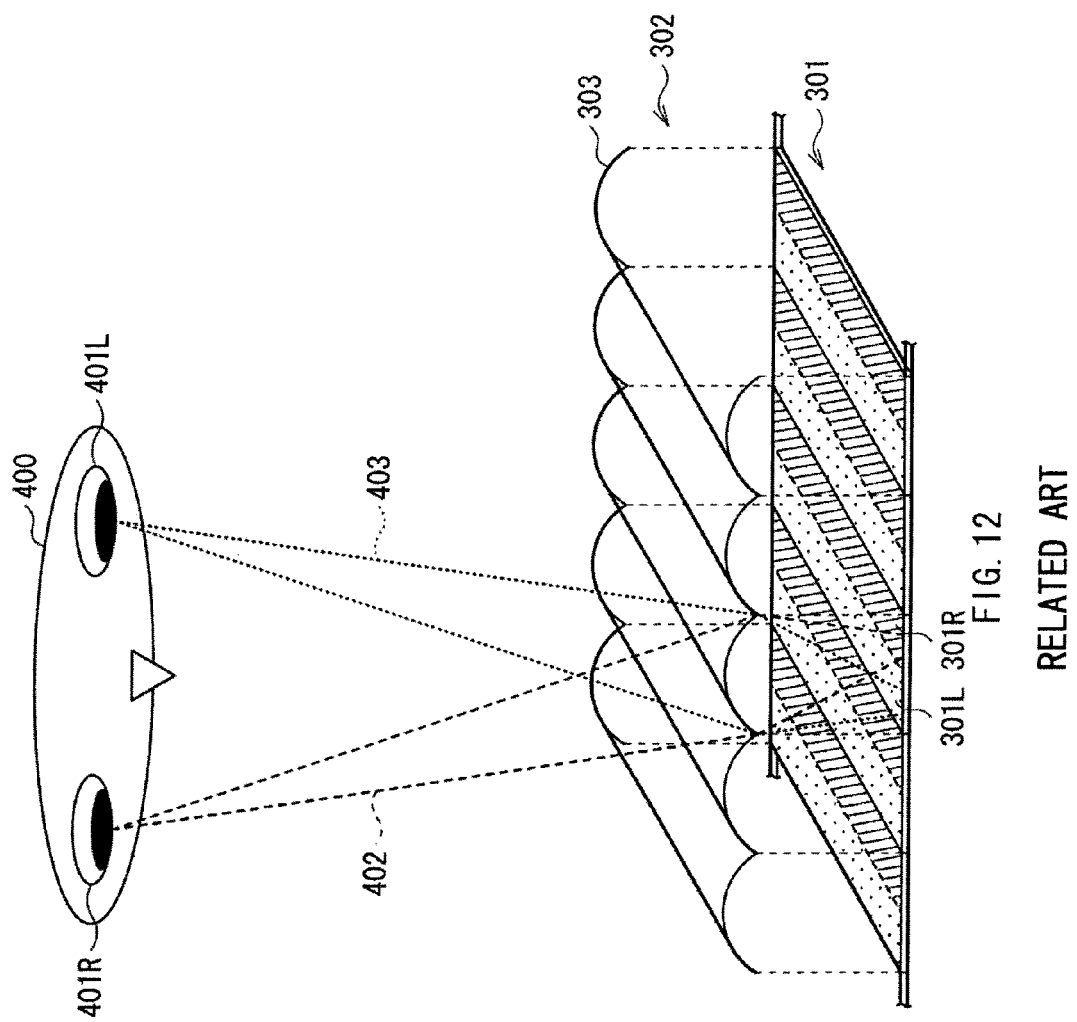
FIG. 12 is an explanatory diagram illustrating a concept of stereoscopic display by a lenticular system.

FIG. 10 illustrates a relationship between a pixel arrangement of the display panel 2 in the second arrangement state and an arrangement of the second cylindrical lens 31X by the lens array device 1 in the stereoscopic display according to the embodiment. FIG. 11 illustrates a relationship between a pixel arrangement of the display panel 2 in the first arrangement state and an arrangement of the first cylindrical lens 31Y by the lens array device 1. Also in the embodiment, in the case where the display panel 2 is in the first arrangement state, as illustrated in FIG. 11, in the lens array device 1, a plurality of first cylindrical lenses 31Y are arranged in parallel so that axes of the cylindrical lenses 31Y are inclined from a vertical direction in the plane parallel to the display surface 2A. Moreover, in the case where the display panel 2 is in the second arrangement state, as illustrated in FIG. 10, a plurality of second cylindrical lenses 31X are arranged in parallel along the horizontal direction so that the axes of the second cylindrical lenses 31X are directed to a vertical direction in the plane parallel to the display surface 2A. In addition, also in the embodiment, to switch a lens effect between such two directions in the lens array device 1, an electrode configuration illustrated in FIG. 8(A) may be used. In other words, a lens effect in a state illustrated in FIG. 8(B) is produced in the first arrangement state. In the second arrangement state, a lens effect in a state illustrated in FIG. 8(C) is produced, and the lens array device 1 is structurally rotated by 90° together with the display panel 2, thereby the second cylindrical lenses 31X are arranged in parallel along the X-axis direction in configuration space.

In the embodiment, in the case of the second arrangement state (refer to FIG. 10), the display panel 2 has a pixel configuration in which a combination of sub-pixels 43R, 43G and 43B of different colors configuring a unit pixel for color display is arranged to form a delta arrangement. Moreover, in the case of the first arrangement state (refer to FIG. 11), a combination of sub-pixels 43R, 43G and 43B of different colors arranged in respective different vertical lines is used as a unit pixel for color display.

In FIGS. 10 and 11, a combination of adjacent sub-pixels 43R, 43G and 43B to which the same number is assigned (Ri, Gi and Bi, i=1, 2, 3, . . . ) forms a unit pixel for color display. In each of FIGS. 10 and 11, for example, a combination of sub-pixels 43R, 43G and 43B (R2, G2 and B2) surrounded by a broken line forms a unit pixel.

In such a pixel configuration, in the second arrangement state, the configuration of the unit pixel is in a delta arrangement, and the sub-pixels 43R, 43G and 43B of the colors are two-dimensionally arranged. Therefore, color unevenness is reduced by a diffusion effect by the second cylindrical lenses 31X. Moreover, the light-shielding section 42 is discontinuously present in the vertical direction, so color unevenness and luminance unevenness are allowed to be eliminated without diagonally arranging the second cylindrical lenses 31X. Thereby, in the case of the second arrangement state, unlike the configuration example in FIG. 19, an issue in the slanted lenticular system that it is difficult to separate parallax images due to a large inclination angle of the second cylindrical lens 31X does not occur.

On the other hand, in the first arrangement state, the first cylindrical lens 31Y is inclined to use the slanted lenticular system, thereby color unevenness and luminance unevenness are allowed to be eliminated. In this case, when the inclination angle θ of the first cylindrical lens 31Y is too large, an issue that it is difficult to separate parallax images occurs as a disadvantage of the slanted lenticular system. Therefore, the inclination angle θ preferably satisfies the following conditions.

In the display panel 2, the sub-pixels 43R, 43G and 43B of the colors each have a square shape with the same size. Then, in the first arrangement state (refer to FIG. 11), pixel pitches in the horizontal direction and the vertical direction of each of the sub-pixels 43R, 43G and 43B are defined as Px and Py, respectively. Moreover, pixel widths in the horizontal direction and the vertical direction are defined as Wx and Wy, respectively. In the case of the first arrangement state, it is preferable that the inclination angle θ of the first cylindrical lens 31Y is 45° or less and a distance between the sub-pixels is small as a pixel configuration. In this case, in the pixel arrangement illustrated in FIG. 11, when a combination of the sub-pixels 43R, 43G and 43B (R1, G3 and B5) successively arranged in a diagonal direction is used as a unit pixel for color display, the inclination angle θ is obtained by the following expression:

$$\theta=\tan^{-1}(2Px/Wy)$$

In this case, in the delta arrangement, when the aspect ratio of each of the sub-pixels 43R, 43G and 43B of the colors is 1:1, Wx=Wy and Px=Py are established, and the inclination angle θ is larger than 45° by Wx<Px. Therefore, as the combination of the sub-pixels 43R, 43G and 43B, a combination of the sub-pixels (R1, G1 and B1) which do not overlap with one another in the vertical direction and are arranged at a small distance from one another is preferable. At this time, the inclination angle θ of the first cylindrical lens 31Y is obtained by the following expression:

$$\theta=\tan^{-1}(Wx/(2Py+Wy/2))$$

At this time, Wx and Wy each have an arbitrary value, but in the case where Wy is approximately equal to Py (Py≈Wy), θ=tan⁻¹(2/5) is established, thereby the inclination angle θ is approximately 21.8°. Thereby, the inclination angle θ has a value at which a state where the degree of separation of parallax images is large in the horizontal direction is achievable. In other words, the inclination angle θ has a sufficient value to achieve stereoscopic vision in the horizontal direction.

As described above, also in the embodiment, the arrangement direction of the cylindrical lenses and the combination of sub-pixels used as a unit pixel for color display are optimized depending on the arrangement state of the display panel 2, so favorable stereoscopic vision is achievable. In other words, in both of the first arrangement state and the second arrangement state where the arrangement directions of the display panel 2 are different by 90° from each other, natural stereoscopic vision with less color unevenness and less luminance unevenness is achievable. In particular, in the embodiment, as the pixel configuration of the display panel 2, a typical delta arrangement is used, so the same effects as those in the first embodiment are easily obtained without using a special pixel configuration as illustrated in FIGS. 1 and 2.

The present application contains subject matter related to that disclosed in Japanese Priority Patent Application JP 2009-097371 filed in the Japan Patent Office on Apr. 13, 2009, the entire content of which is hereby incorporated by references.

It should be understood by those skilled in the art that various modifications, combinations, sub-combinations and alterations may occur depending on design requirements and other factors insofar as they are within the scope of the appended claims or the equivalents thereof.

What is claimed is:

1. A stereoscopic display comprising:
a display panel configured to display an image in a first arrangement state and a second arrangement state; and
a variable liquid crystal device arranged to face a display surface of the display panel,
wherein the variable liquid crystal device has a first electrode, a second electrode, and a liquid crystal layer disposed between the first electrode and the second electrode, and is configured to change a refractive index distribution in the liquid crystal layer by controlling a potential between the first electrode and the second electrode,
wherein sub-pixels in the display panel have a rectangular shape, a longer side direction of the sub-pixels coincides with the vertical direction when the display panel is the first arrangement state, and a shorter side direction of the sub-pixels coincides with the vertical direction when the display panel is in the second arrangement state, and
the sub-pixels are sequentially disposed in a brick layer staggered arrangement, and further wherein at least one of the first electrode and the second electrode is arranged along a first direction different from the longer side direction and the shorter side direction.

2. The stereoscopic display according to claim 1, wherein the variable liquid crystal device is a variable liquid crystal lens having the liquid crystal layer which is configured to selectively produce a cylindrical-lens effect as an effect of the plurality of cylindrical lenses, the cylindrical-lens effect being allowed to be produced in either one of two different directions by electrically changing a refractive index distribution in a liquid crystal layer.

3. A stereoscopic display comprising:
a display panel configured to display an image in a first arrangement state and a second arrangement state; and
a variable liquid crystal device arranged to face a display surface of the display panel,
wherein the variable liquid crystal device has a first electrode, a second electrode, and a liquid crystal layer disposed between the first electrode and the second electrode, and is configured to change a refractive index distribution in the liquid crystal layer by controlling a potential between the first electrode and the second electrode,
wherein sub-pixels in the display panel have a rectangular shape, a longer side direction of the sub-pixels coincides with the vertical direction when the display panel is the first arrangement state, and a shorter side direction of the sub-pixels coincides with the vertical direction when the display panel is in the second arrangement state, and
the sub-pixels are sequentially disposed in a brick layer staggered arrangement; and further, wherein
when the display panel is in the first arrangement state, each of the plurality of sub-pixels corresponding to each of a plurality of colors are cyclically arranged along a vertical line, and when the display panel is in the second arrangement state, the sub-pixels of the plurality colors are cyclically arranged in a horizontal line, while a sub-pixel of a color on a first horizontal line and a sub-pixel of same color on a second horizontal line which is adjacent to the first horizontal line are arranged with no interval in the horizontal direction and overlap with each other, and
when the display panel is in the second arrangement state, a combination of sub-pixels of different colors arranged in respective different horizontal lines is used as the unit pixel for color display, and when the display panel is in the first arrangement state, a combination of sub-pixels of different colors arranged in respective different vertical lines is used as the unit pixel for color display.

4. A stereoscopic display comprising:
a display panel configured to display an image in a first arrangement state and a second arrangement state; and
a variable liquid crystal device arranged to face a display surface of the display panel,
wherein the variable liquid crystal device has a first electrode, a second electrode, and a liquid crystal layer disposed between the first electrode and the second electrode, and is configured to change a refractive index distribution in the liquid crystal layer by controlling a potential between the first electrode and the second electrode;
wherein sub-pixels in the display panel have a rectangular shape, a longer side direction of the sub-pixels coincides with the vertical direction when the display panel is the first arrangement state, and a shorter side direction of the sub-pixels coincides with the vertical direction when the display panel is in the second arrangement state, and
the sub-pixels are sequentially disposed in a brick layer staggered arrangement; and further, wherein
a pixel width Wy in the longer side direction satisfies the following relational expression:

$$Wy = Py(1 - 1/N), \text{ and}$$

an angle $\theta$ satisfies the following expression:

$$\theta = \tan^{-1}(Px/(Py(1+1/N))),$$

where Px and Py represent pixel pitches in the shorter side direction and the longer side direction of the sub-pixels, respectively,
Wy represents a pixel width of the sub-pixels in the longer side direction,
$\theta$ represents an inclination angle of axes of cylindrical lenses selectively produced by the variable liquid crystal device with respect to the vertical direction of the display panel in the first arrangement state, and
N represents a number in the vertical direction of sub-pixels which configure a three-dimensional pixel as a unit pixel for a stereoscopic image in the second arrangement.

5. A stereoscopic display comprising:
a display panel configured to display an image in a first arrangement state and a second arrangement state; and
a variable liquid crystal device arranged to face a display surface of the display panel,
wherein the variable liquid crystal device has a first electrode, a second electrode, and a liquid crystal layer disposed between the first electrode and the second electrode, and is configured to change a refractive index distribution in the liquid crystal layer by controlling a potential between the first electrode and the second electrode,
wherein sub-pixels in the display panel have a rectangular shape, a longer side direction of the sub-pixels coincides with the vertical direction when the display panel is the first arrangement state, and a shorter side direction of the sub-pixels coincides with the vertical direction when the display panel is in the second arrangement state, and
the sub-pixels are sequentially disposed in a brick layer staggered arrangement; and further, wherein
a combination of sub-pixels of different colors which configures the unit pixel for color display is arranged to form a delta arrangement, when the display panel is in the second arrangement state, and
a combination of sub-pixels of different colors arranged in respective different vertical lines is used as a unit-pixel for color display, when the display panel is in the first arrangement state.

6. The stereoscopic display according to claim 5, wherein the sub-pixels in the display panel have a square shape, and an angle $\theta$ satisfies the following expression:

$$\theta = \tan^{-1}(Wx/(2Py+Wy/2)),$$

where $\theta$ represents an inclination angle of axes of cylindrical lenses selectively produced by the variable liquid crystal device with respect to the vertical direction of the display panel in the first arrangement state,
Py represents a pixel pitch of the sub-pixels in a vertical direction, and
Wx and Wy represent pixel widths of the sub-pixels in a horizontal direction and a vertical direction, respectively, in the first arrangement state.

* * * * *